US008550643B2

(12) United States Patent
Kownacki et al.

(10) Patent No.: US 8,550,643 B2
(45) Date of Patent: Oct. 8, 2013

(54) LIGHTED FITTINGS FOR BATHING INSTALLATIONS

(75) Inventors: Eric J. Kownacki, San Diego, CA (US); Graham J. Campbell, Stevenson Ranch, CA (US)

(73) Assignee: Balboa Water Group, Inc., Tustin, CA (US)

( * ) Notice: Subject to any disclaimer, the term of this patent is extended or adjusted under 35 U.S.C. 154(b) by 299 days.

(21) Appl. No.: 12/985,357

(22) Filed: Jan. 6, 2011

(65) Prior Publication Data

US 2011/0164400 A1 Jul. 7, 2011

Related U.S. Application Data

(63) Continuation-in-part of application No. 12/039,465, filed on Feb. 28, 2008, now Pat. No. 8,042,962.

(51) Int. Cl.

| | |
|---|---|
| ***G01D 11/28*** | (2006.01) |
| ***F21V 15/01*** | (2006.01) |
| ***F21V 33/00*** | (2006.01) |

(52) U.S. Cl.
USPC ........... 362/96; 362/23.2; 362/23.22; 362/85; 362/234

(58) Field of Classification Search
USPC ............ 362/23.03, 23.04, 23.05, 23.1, 23.12, 362/23.13, 23.18, 23.2, 85, 96, 101, 249.02, 362/249.03, 382, 457, 234
See application file for complete search history.

(56) References Cited

U.S. PATENT DOCUMENTS

| | | | | |
|---|---|---|---|---|
| 3,587,184 A * | 6/1971 | Walker | 362/457 |
| 5,045,978 A * | 9/1991 | Gargle | 362/101 |
| 5,217,292 A * | 6/1993 | Chalberg | 362/96 |
| 6,942,354 B2 * | 9/2005 | Metayer et al. | 362/101 |
| 7,073,916 B2 * | 7/2006 | Yin et al. | 362/84 |
| 7,722,216 B2 * | 5/2010 | Amor et al. | 362/249.01 |
| 2009/0106890 A1 * | 4/2009 | Rosenau | 4/580 |

* cited by examiner

*Primary Examiner* — Alan Cariaso
(74) *Attorney, Agent, or Firm* — Larry K. Roberts

(57) ABSTRACT

A fitting for through hole mounting to a panel of a bathing installation includes in one exemplary embodiment a flange structure fabricated of a transparent or translucent material, the flange structure including a hollow body portion adapted to extend through a mount hole in the panel and having an outer peripheral portion, and a transverse flange portion having an outer size larger than the hole opening, so that a peripheral flange portion overlaps the panel surrounding the hole when the flange structure is installed in the mount hole. A light source attachment portion is attached to the body portion of the flange structure and configured so that with the flange structure mounted to the panel, light emitted from one or more light sources mounted in the light source attachment portion is transmitted through the body portion and into the transverse flange portion to illuminate at least a portion of the transverse flange portion.

27 Claims, 23 Drawing Sheets

LIGHTED FITTINGS FOR BATHING INSTALLATIONS

CROSS-REFERENCE TO RELATED APPLICATION

This application is a continuation-in-part of U.S. application Ser. No. 12/039,465, filed Feb. 28, 2008, issued as U.S. Pat. No. 8,042,962, the entire contents of which are hereby incorporated by reference.

BACKGROUND

Bathing installations such as whirlpool baths, spas and pools may include one or more fittings passed through an opening in the wall or surface of bathing installations, e.g., a wall or surface of a water receptacle such as a tub or pool. The fittings may be for air jets, water jets, suction fittings, valves air or electronic controls, cup holders, water features, audio speakers, video displays, or any other fitting passed through a wall of the bathing installation. It may be desirable to provide the fittings with lighting.

BRIEF DESCRIPTION OF THE DRAWINGS

Features and advantages of the disclosure will readily be appreciated by persons skilled in the art from the following detailed description when read in conjunction with the drawing wherein:

FIGS. 13A and 13B are isometric and side exploded views. FIG. 13C is an end view of the valve with the handle removed. FIG. 13D is an end view of the valve with the handle in place.

FIGS. 14A and 14B are isometric and side exploded views. FIG. 14C is an end view of the valve with the handle removed. FIG. 14D is an end view of the valve with the handle in place.

FIGS. 15A and 15B are isometric and side exploded views. FIG. 15C is an end view of the valve.

FIGS. 16A and 16B are isometric and side exploded views. FIG. 16C is an end view of the valve.

DETAILED DESCRIPTION

Figure 1:
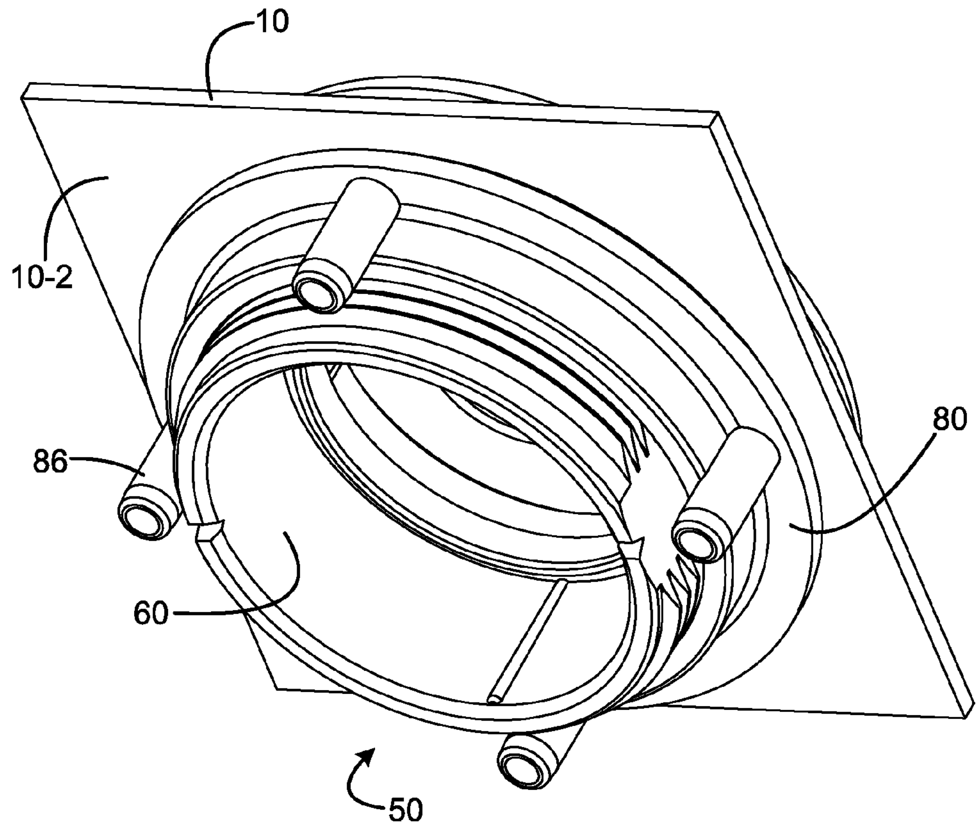
FIGS. 1-2 are front and back isometric views of an exemplary embodiment of a lighted fixture mounted in a panel.
Figure 2:
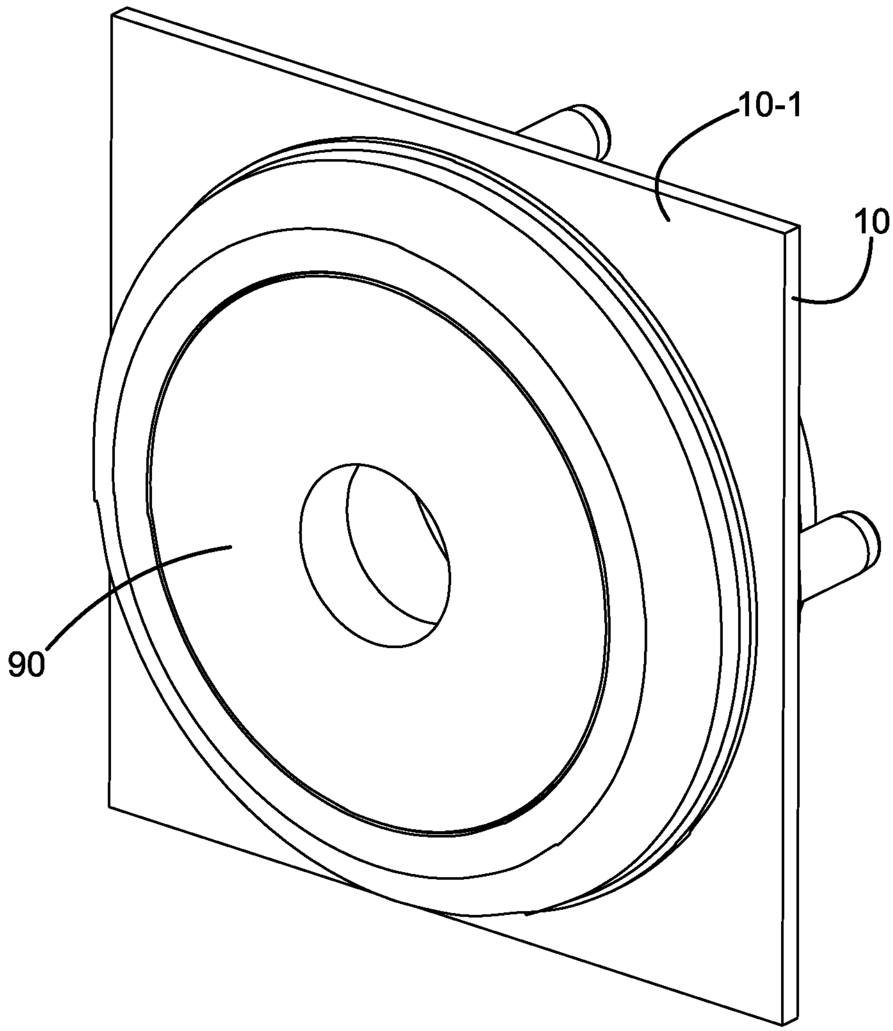

In the following detailed description and in the several figures of the drawing, like elements are identified with like reference numerals. The figures are not to scale, and relative feature sizes may be exaggerated for illustrative purposes.

An exemplary embodiment of a lighted fixture assembly 50 adapted for through-hole mounting in a panel or wall is illustrated in FIGS. 1-6. An exemplary application for the fixture assembly is for mounting in a tub wall 10 (FIG. 1) of a bathing installation such as a spa or whirlpool bath.

Figure 5:
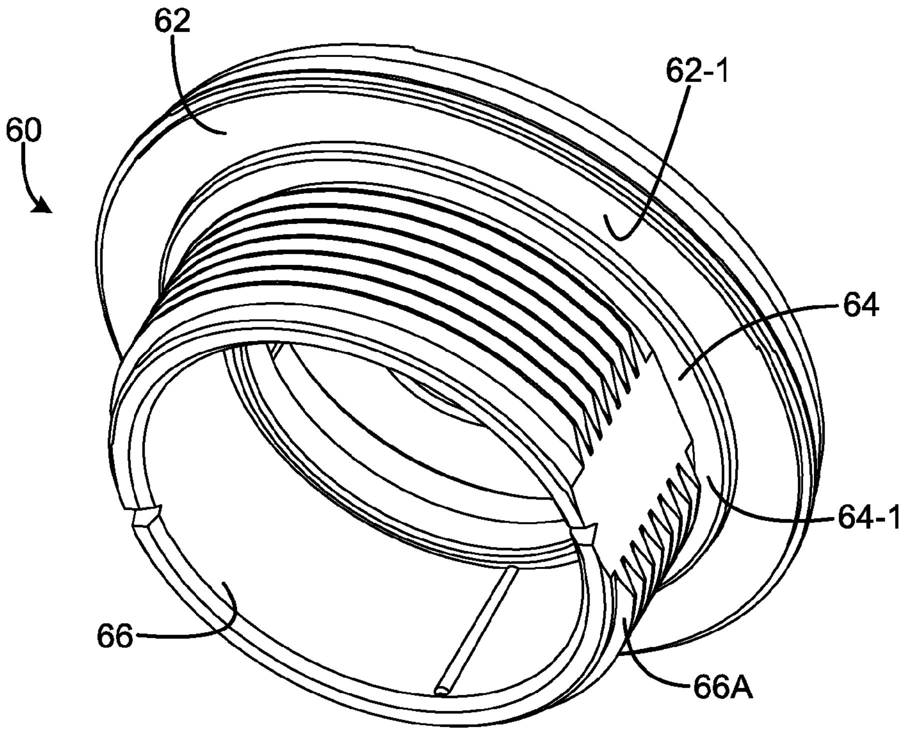
FIG. 5 is an isometric view of a flange structure of the lighted fixture of FIG. 1.
Figure 6:
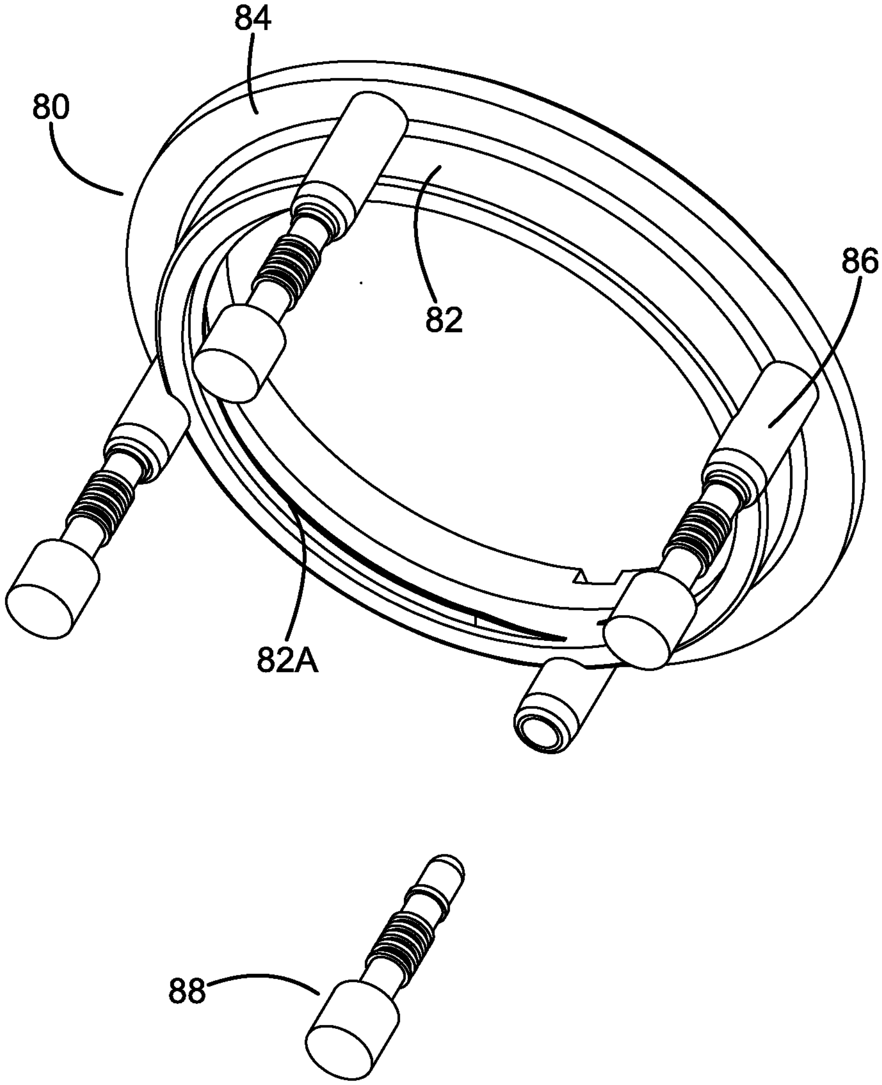
FIG. 6 is an isometric view of an exemplary embodiment of an integrated nut and light fixture structure of FIG. 1 with LED light fixtures in assembled and exploded positions in respect light fixtures of the structure.

The fixture assembly 50 includes a flange structure 60 fabricated from a translucent material such as clear ABS, clear acrylic or clear polycarbonate, and is shown in isolation in FIG. 5. A threaded nut and light source receptacle member 80 is configured to be threaded onto a threaded region of the flange structure, and secure the flange structure in place against the wall 10. Light sources 88 (FIG. 6) such as incandescent bulbs, LED lights or fiber optic fibers connected to a remotely located light source are disposed in receptacles 86 disposed at spaced locations around the periphery of the nut portion of the member 80.

In an exemplary embodiment, the member 80 is also fabricated from a translucent or transparent material such as ABS, clear acrylic or clear polycarbonate. Some of the light generated by the light sources in the light source receptacles is transmitted through the member 80 and the flange structure 60, to provide a lighted assembly visible on the opposite side 10-1 (FIG. 2) of the wall 10 from the side 10-2 (FIG. 1) faced by the nut and light source receptacle member 80.

The flange structure 60 in an exemplary embodiment includes a flange portion 62 and a shoulder portion 64 protruding from a body portion 66 (FIG. 5). The body portion 66 may have a set of threads 66A formed on its outer periphery to engage threads 82A (FIG. 6) of the nut and light source member 80. Alternative embodiments of the flange structure may omit the threads, and the flange structure secured to a corresponding non-threaded member 80 by press-fitting, adhesive or clip-locking. The outer diameter of the body portion 66 is smaller than an opening diameter size of the mounting opening 10-3 (FIG. 3) formed in the wall 10, as is the outer diameter of the shoulder portion 64, so that the body portion 66 and shoulder portion 64 may be fitted into the opening in the tubular portion. The flange portion 62 has an outer diameter larger than the opening diameter, so that the flange portion overlaps onto the wall adjacent the periphery of the wall opening.

Figure 3:
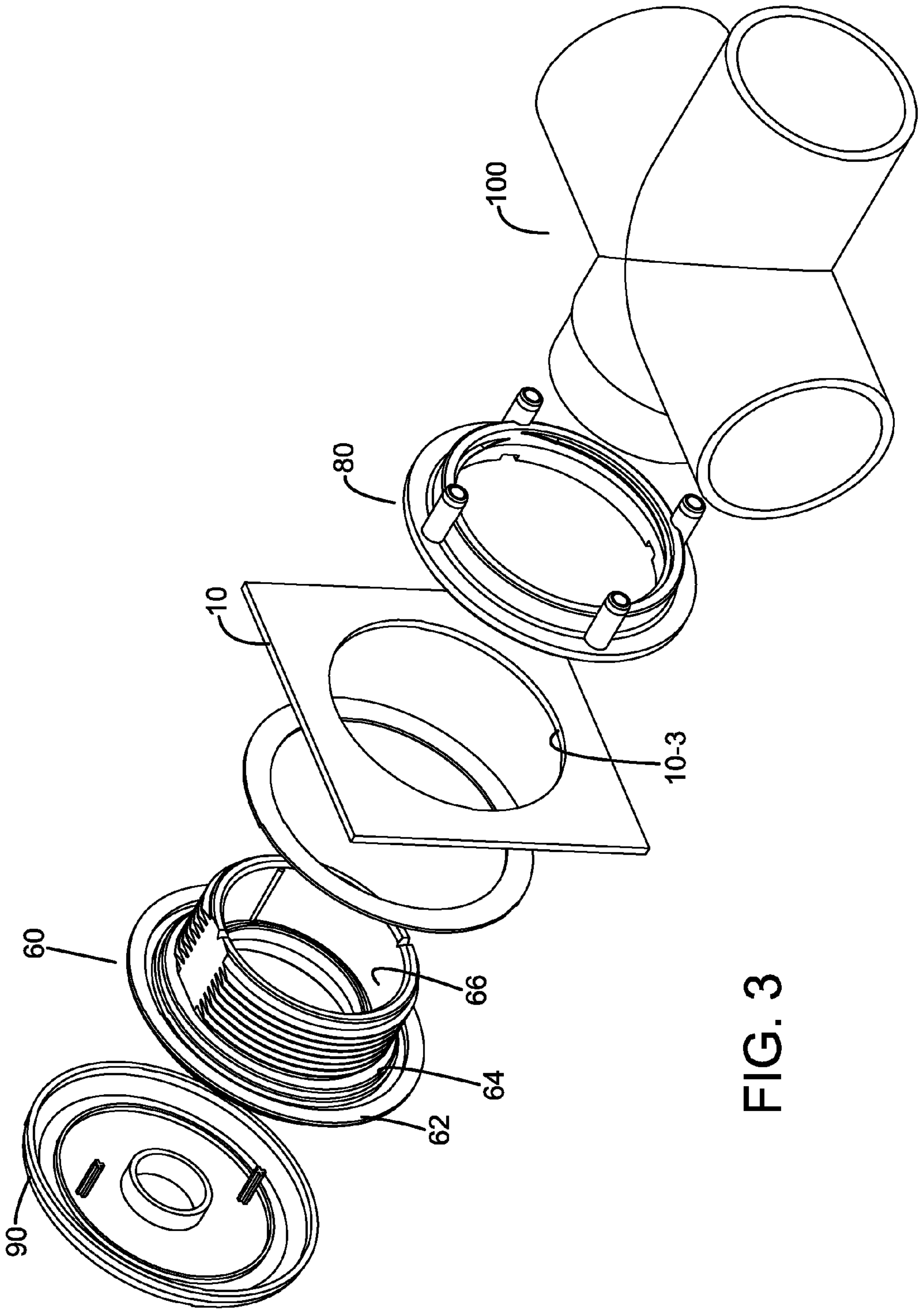
FIGS. 3-4 are exploded front and rear isometric views of an exemplary embodiment of a lighted fixture connected in a bathing installation.
Figure 4:
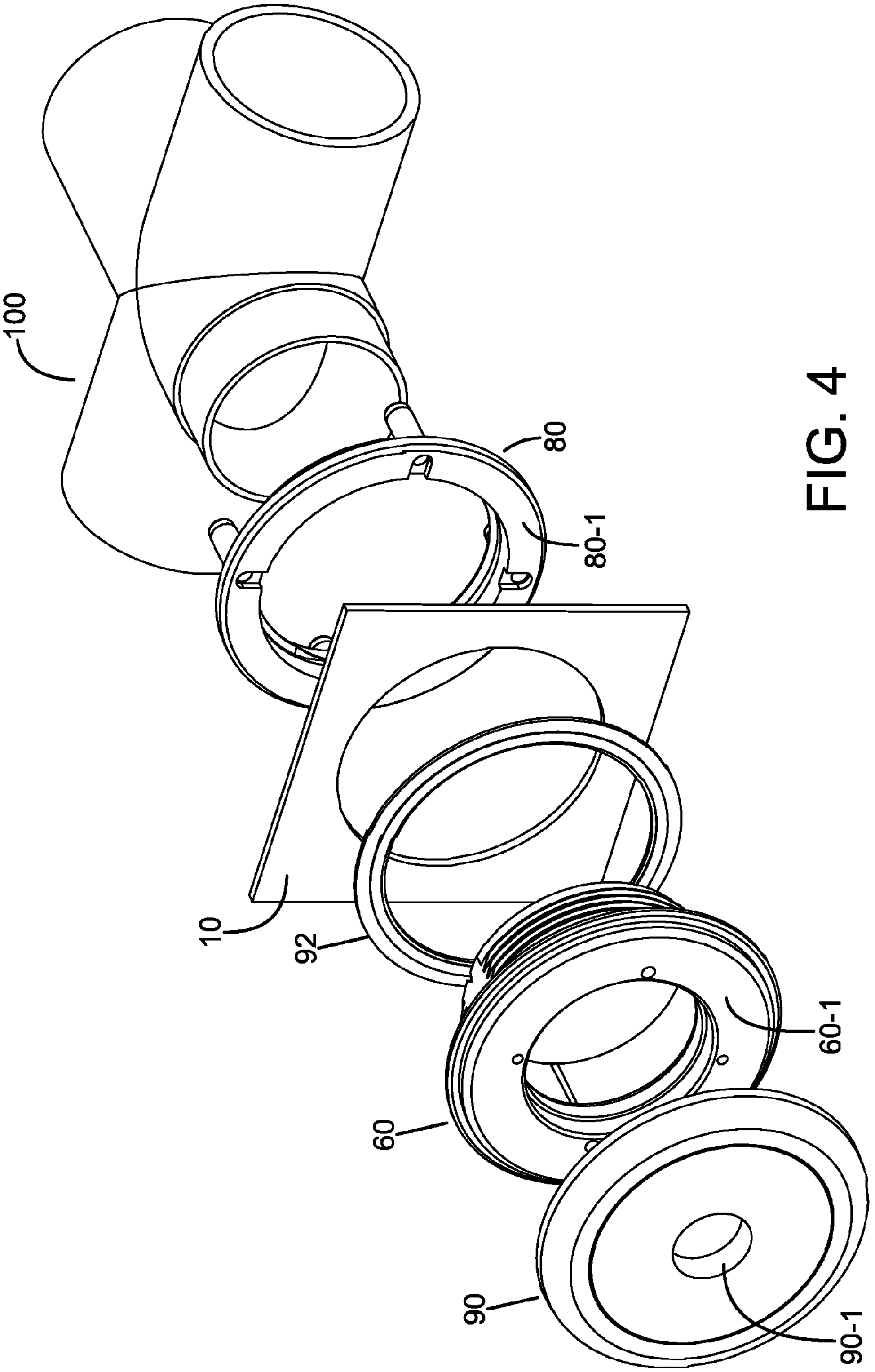

In one exemplary embodiment, the body portion 66 has a hollow generally cylindrical configuration, open at the end distal from the flange portion and adapted to be assembled to a pipe or tube. In one exemplary embodiment, the hollow tubular portion 66 of the flange structure 60 has an inner diameter of two inches to be assembled to a fitting such as a diverter valve structure 100 (FIG. 3). Of course, other applications may employ fittings of other dimensions, and the fitting dimensions of assembly 50 may be modified or scaled appropriately.

In an exemplary embodiment, the shoulder portion 64 of the flange structure has a depth dimension measured from the surface 62-1 (FIG. 5) of the flange portion to the shoulder surface 64-1 (FIG. 5) which may be about equivalent to or preferably slightly less than the thickness of the wall 10. The shoulder portion 64 also has an outer diameter larger than the outer diameter of the tubular portion 66. This allows the facing surface 80-1 (FIG. 4) of the nut and light holder structure 80 to be brought close to the shoulder surface 64-1 when the structure 80 is assembled to the flange structure on a wall mount installation, while allowing the nut member 80 to be tightened on the outer body of the flange structure 60 to secure the assembly in the opening of the wall or surface. To increase the amount of light transmitted through to the flange structure, any space between the facing surfaces 80-1 and 64-1 may be filled with a clear or translucent gel, e.g. an RTV silicon rubber, or a clear gel with a refractive index matching those of the flange structure and the nut assembly. In an exemplary embodiment, light from the light sources 88 in the receptacles 86 is transmitted through the transparent material of the nut structure 80 into the shoulder portion 64 of the flange structure 60, and then through the transparent material of the flange structure 60 to illuminate the surface 60-1 of the flange structure on the opposite side of the wall from the nut and light holder assembly 80.

The assembly 50 may include an end cap 90 which is assembled to the flange structure 60, in an exemplary embodiment in which the assembly is connected to a diverter valve installed in housing 100 connected to a bathing installation water or air pump. The cap 90 may also be fabricated of a transparent or translucent material to allow light from the light sources to be transmitted through the cap. An opening 90-1 permits a handle stem (not shown) from the valve inside housing 100 to protrude, for attachment to a handle for a user to set the valve to a desired position.

An elastomeric gasket 92 (FIG. 4) may be employed as a water seal in some embodiments, and may also be fabricated of a translucent or transparent material. In other embodiments, a transparent curable liquid sealant, e.g. an RTV sealant, may be used to seal the flange structure against the wall 10 instead of, or in addition to, a gasket 92.

With the light receptacles 86 formed as a fixed part of the nut member 80, the light receptacles rotate with the nut member 80 as the nut member is rotated during installation to tighten the nut member against the wall 10. This configuration avoids clearance problems associated with other configurations in which the light receptacles are fixed in a stationary position relative to the wall 10 in a relatively close arrangement relative to the nut member.

In an exemplary embodiment, the light receptacles 86 may be fabricated as a unitary one-piece member with the nut portion of the nut member 80, of a material transparent to visible light. For example, the nut member and light receptacles, as well as the flange structure 60, may be fabricated by injection molding, e.g. of a clear ABS. Alternatively, the light receptacles may be fabricated as separate elements, which are attached to the nut member 80, e.g. by press-fitting into holes formed in the periphery of the nut member, by adhesive attachment or threaded attachment. In an exemplary embodiment, the light sources 88 may be secured in receptacles 86 by interference fit.

Figure 7:
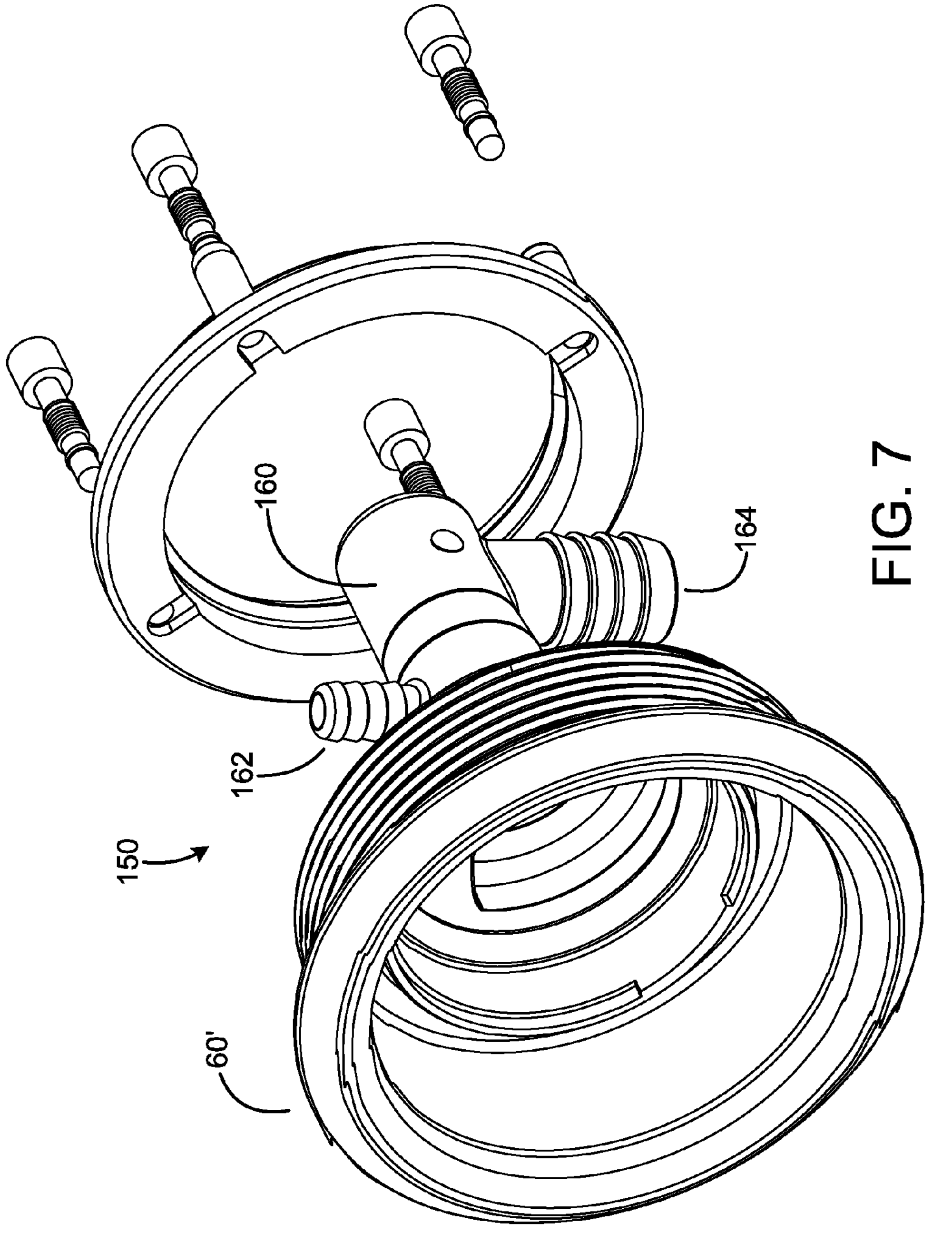
FIGS. 7-8 are isometric exploded views of an alternate embodiment of a lighted fixture for a bathing jet installation.
Figure 8:
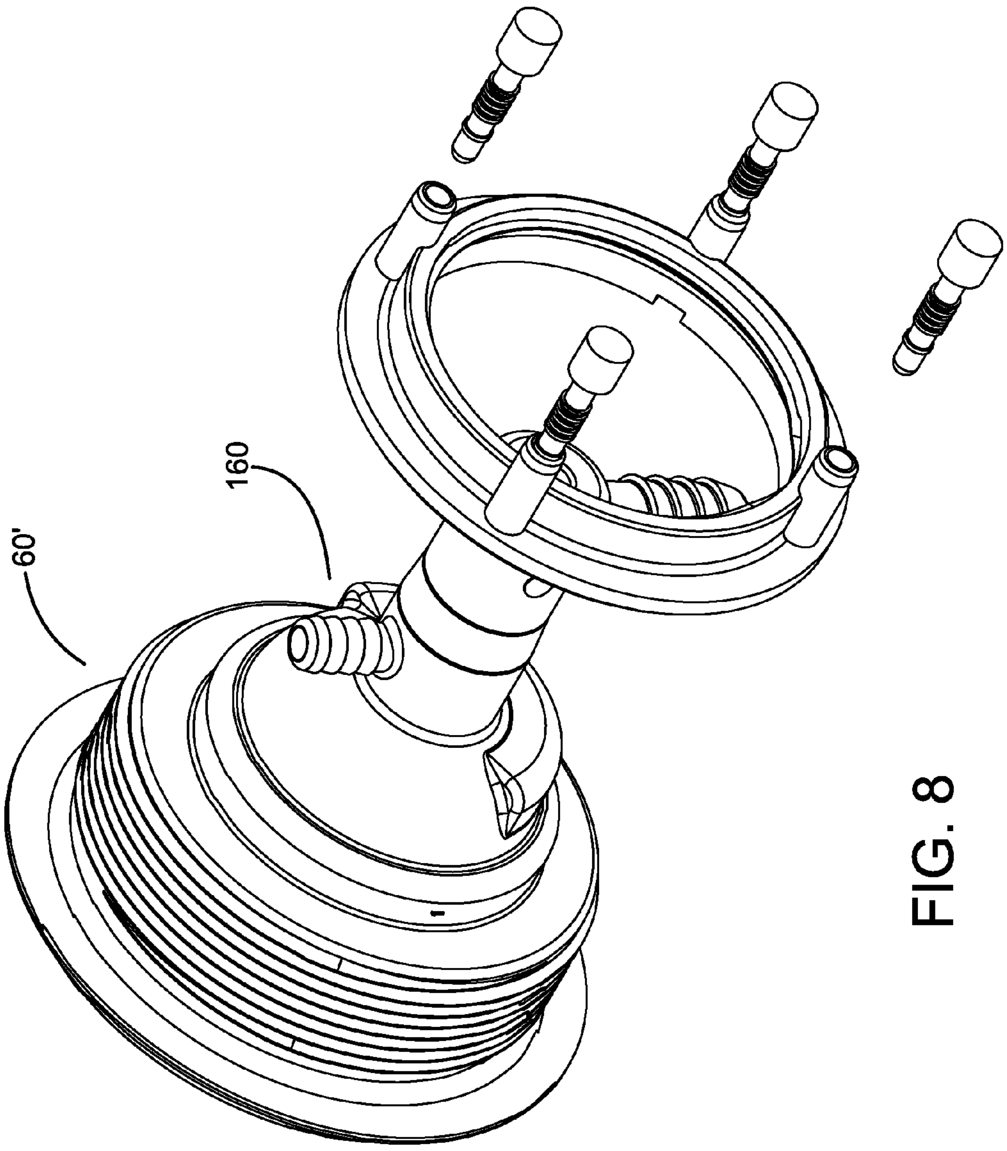

The lighted fixture assembly may be configured for use in various functions other than as a diverter valve connection. For example, FIGS. 7-8 depict a lighted fixture assembly in which the flange portion 60' is adapted for connection to fluid lines. In this example, the flange portion 60' has a closed end region 160 in which are formed two ports 162, 164 for connection to fluid lines (not shown). For example, port 164 may be a water port connected to a water pump through a water line, and port 162 may be an air port connected to an air line. The flange portion 60' may include a jet configured with a venturi, so that water pumped through the jet from the port 164 also draws air from port 162. The connection of the flange portion 60' in this embodiment is by a nut and light holder portion 80, as in the embodiment of FIGS. 1-6.

Figure 9:
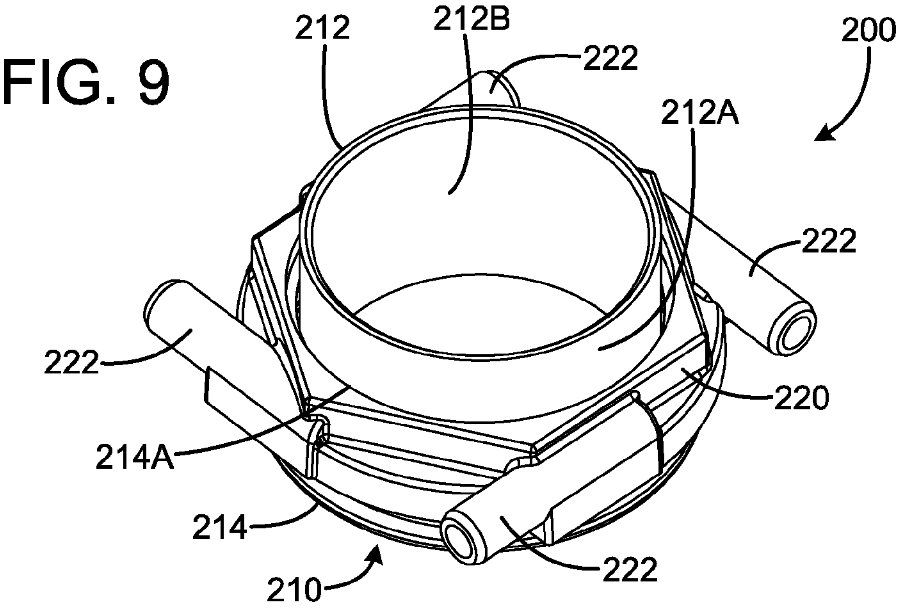
FIG. 9 is an isometric view of another alternate embodiment of a lighted fitting.

FIG. 9 is an isometric view of an alternate embodiment of a lighted fitting 200. As with the embodiment of FIG. 1, for example, the fitting 200 includes a flange structure 210 and a nut and light fitting member 220. In this embodiment, the flange structure includes a body portion 212 and a flange portion 214. The body portion 212 may be inserted through an opening in the wall or surface of the bathing installation, with the flange portion seating against the edge of the wall or surface surrounding the opening. The body portion 212 includes an inner cylindrical surface 212B, and an outer surface 212A. The outer surface 212A is not threaded in this embodiment, nor is the inner surface of the nut and light fitting member 214. Instead, the nut and fitting member 214 is configured for a press fit or slip fit onto the outer surface 212A of the body portion of the flange structure. A final connection can be made by adhesively fixing the member 214 onto the body portion 212A, or by an interference fit.

The nut and light fitting member 214 also differs from the member 80 (FIG. 1) in that the light fittings 222 are oriented in generally tangential directions relative to the interior opening 214A defined by the member 214. Thus, instead of being oriented in a generally perpendicular arrangement relative to the wall 10 (FIG. 1) when the fitting 50 is assembled to the wall, the fittings 222 are oriented in a generally parallel arrangement relative to the wall or surface in which the fitting assembly 200 is installed. This provides the advantage that less clearance room need be provided in a given bathing installation behind the wall or surface. Other orientations of the light fittings 220 may alternatively be employed, e.g., in which the light fittings 220 are oriented at an acute angle relative to the wall or surface, instead of being oriented in a generally parallel relationship.

Figure 10:
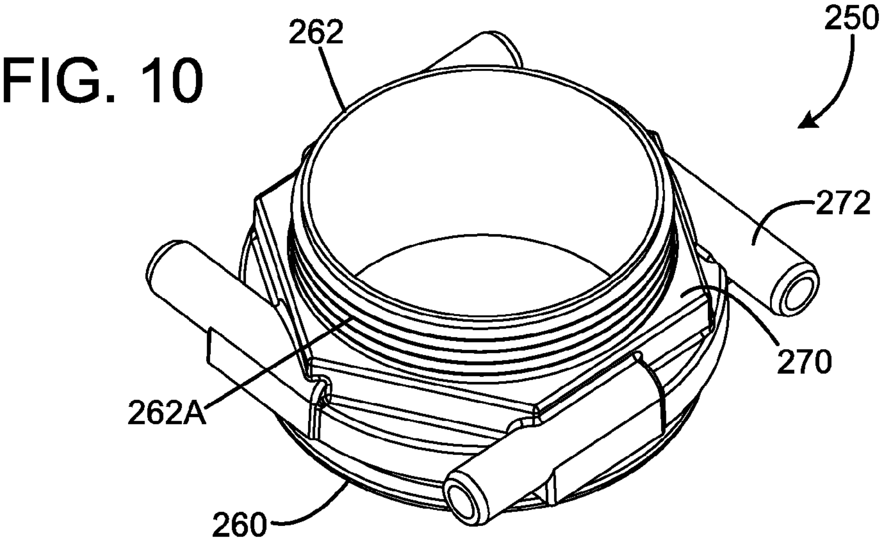
FIG. 10 is an isometric view of yet another embodiment of a lighted fitting.

FIG. 10 is an isometric view of another embodiment of a lighted fitting 250. The fitting 250 is similar to the fitting 200 of FIG. 9, except that the attachment of the nut and light fitting member 270 to the flange structure 260 is by engagement of threads. Thus, the outer peripheral surface 262A of the body portion 262 of the flange structure is threaded, and the inner surface of the nut and light fitting member 270 is threaded as well. The light fittings 272 of the member 270 are disposed in a generally tangential orientation as in the embodiment of FIG. 9.

Figure 11:
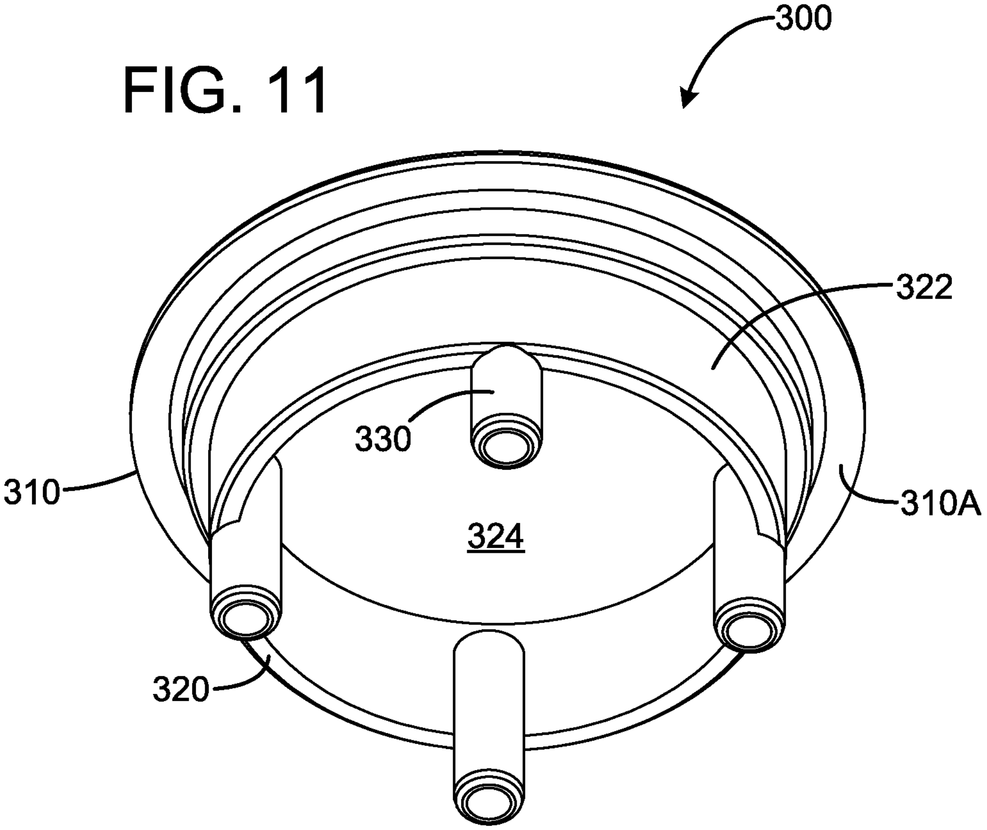
FIG. 11 illustrates an isometric view of a further embodiment of a lighted fitting.

FIG. 11 illustrates an isometric view of a further embodiment of a lighted fitting 300. The fitting 300 does not include a nut member as in the embodiments of FIGS. 1-10. The fitting 300 includes a flange portion 310 and a body portion 320. In an exemplary embodiment, the structure 300 is a one-piece unitary structure, with the flange portion connected at one end of the body portion. The body portion has an interior opening 324, and an outer peripheral surface 320. In this embodiment, the outer peripheral surface has a circular configuration, although other embodiments may be configured with other shapes, e.g. elliptical, oblong, generally rectangular, "snow-man" shaped, and the like. Light fittings or receptacles 330 are disposed in generally tangential orientations on the edges of the body portion 320, and are adapted to hold light sources (not shown in FIG. 11) similar to the light sources 88 described above regarding the embodiment of FIG. 6. The fitting 300 is fabricated from a translucent or transparent material, e.g. clear ABS, clear acrylic or clear polycarbonate. Light from the light sources in the receptacles 330 is passed into the fitting 300, and illuminates the flange portion 310.

The fitting 300 may be inserted in an opening formed in an opening in a wall or surface of a bathing installation, and the flange portion secured to the wall or surface by an adhesive, in an exemplary embodiment. The adhesive may be carried by a gasket structure, or applied in a liquid form when the fitting is inserted into place in the wall opening. The light receptacles 330 are positioned to allow the distal end of the fitting 300 (carrying the light receptacles) to be inserted through the panel opening.

The fitting 300 may be used for various functions, including, by way of example only, a lighted bezel for a cup holder, a fitting for an audio speaker mounted in the open region 324, a lighted bezel for a control device, such as a valve, manual switch or electronic control panel, or a fitting for a display device.

Figure 12:
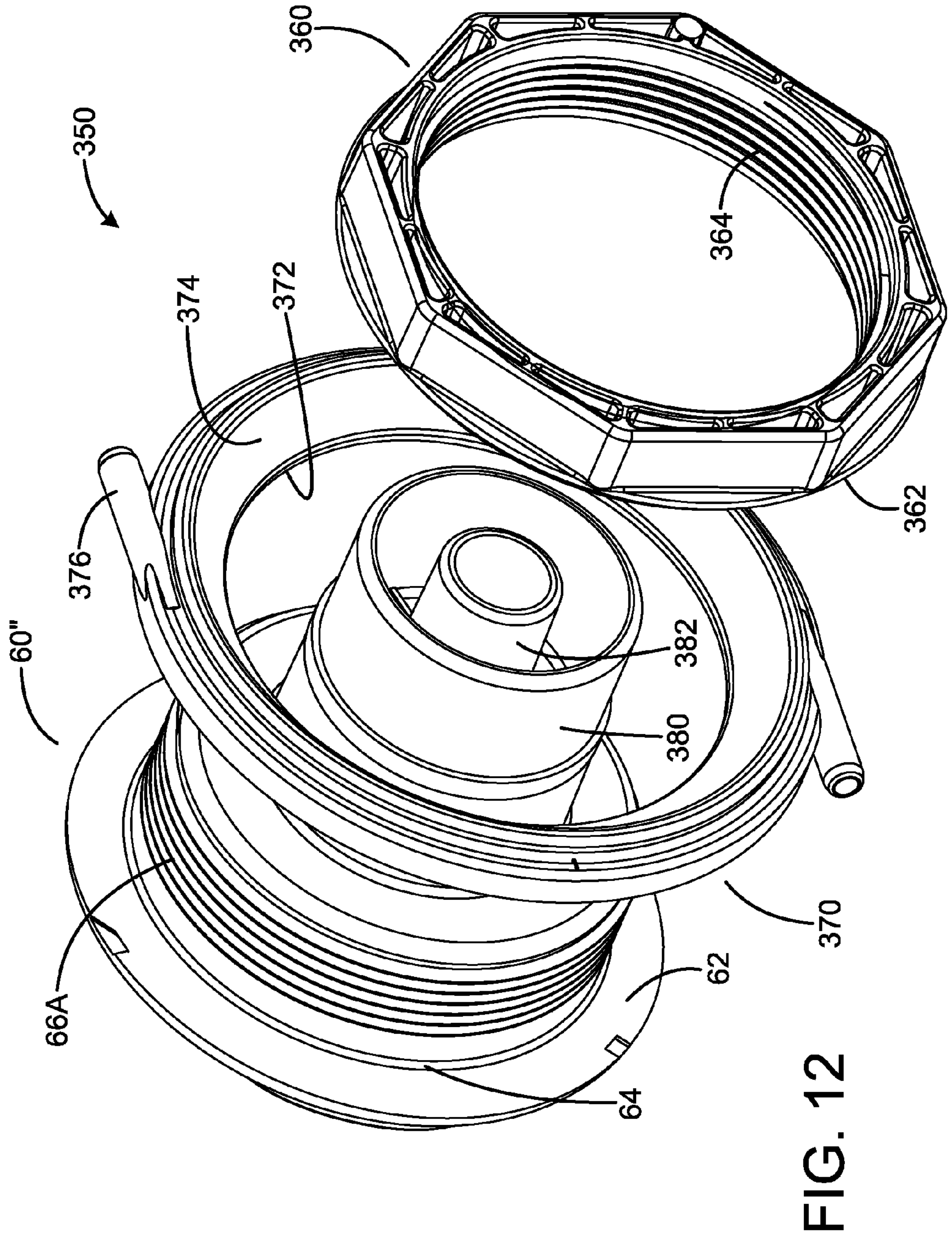
FIG. 12 illustrates an isometric exploded view of another embodiment of a lighted fitting.

FIG. 12 illustrates an exemplary embodiment of a lighted fitting 350 for a bathing installation. The fitting employs a compensation ring structure 370 between the flange structure 60" and a threaded nut 360. The rear surface of the wall of the bathing installation (not shown in FIG. 12) into which the fitting is to be installed may be rough and uneven. The compensation ring structure 370 may be employed to provide compensation between the wall and the facing surface 362 of the nut 360. The facing surface 62 of the flange structure 60" may be planar, as the outside surface of the wall is typically finished and smooth. The surface 372 of the compensation ring may be planar as well, with an opposed concave surface 374. The inner diameter of the ring structure is slightly larger than the outer diameter of the shoulder region 64 of the flange portion. The nut structure 360 includes a facing convex surface 362 and an interior threaded region 364.

When the fitting 350 is assembled into an opening in a wall of a bathing installation, the flange surface 62 is brought against the smooth exterior surface of the wall, the compensation ring 370 is positioned over the threaded portion 66A of the flange structure, and the nut threaded onto the threaded portion 66A and tightened against the ring 370. The respective facing surfaces 374, 362 of the ring and nut allow compensation movement of the ring so that the surface 372 may orient in a cocked relationship relative to the flange structure, depending on the roughness or smoothness of the rear wall surface. If the wall surface is uneven, the surface 372 may not be parallel to surface 62 of the flange structure, yet the nut can be tightened against the ring structure without causing the flange structure to orient in a cocked relationship relative to the wall.

In this exemplary embodiment, the flange structure 60 provides a fitting for a jet structure, and includes cylindrical portion 380 and tube portion 382. The tube portion 380 may be connected to a water line (not shown), and water flows from the water line into the jet through orifice 382.

An exemplary embodiment of the compensation ring 370 includes one or more light receptacles 376 for receiving light sources. The receptacles may be oriented in a tangential fashion as illustrated in FIG. 12, or in another orientation, such as perpendicular or at an acute angle. The tangential orientation positions the sockets away from the nut, reducing the susceptibility to damage caused by wrenches or tools used to tighten the nut on the flange structure.

In an exemplary embodiment, the flange structure 60" and the compensation ring 370 is fabricated from a translucent or transparent material such as ABS, clear acrylic or clear polycarbonate. Some of the light generated by the light sources in the light source receptacles is transmitted through the ring 370 and into the flange structure 60", e.g. through the shoulder region 64, to provide a lighted assembly visible on the opposite side of the wall from the side faced by the nut 360 and ring 370. The nut 360 need not be fabricated of a transparent material in this embodiment, since it is not in the light path from the light sources in the receptacles 376 to the flange structure 60".

While the embodiment of FIG. 12 includes a compensation ring structure and nut with facing surfaces configured to provide movement of the ring to accommodate uneven surfaces, in other embodiments the compensation function may be omitted. For example, the assembly may not include the compensating surfaces on the ring structure and the nut. The lighted function may be provided with a ring or gasket structure and nut with flat surfaces, by including the light receptacles on the periphery of the ring structure as with the ring structure 370.

FIGS. 13A-14D illustrate an exemplary embodiment of an on/off valve assembly 400 for a bathing installation application, in which the valve status is indicated by light from a nut 80 fitted or integrally formed with light receptacles with light sources. In this exemplary embodiment, the valve assembly includes a generally T-shaped body member 410, with water ports 412 and 414, and a valve port 416 which receives a core member 420. The valve port in this example has external threads, and is configured for insertion into the hollow flange 60'" for engaging internal threads in a bezel structure 430 on the water side of the wall. The bezel structure when tightened on the valve body threads secures the valve body in relation to the flange structure. The flange structure is configured for mounting in a bathing installation wall aperture. A threaded nut 80 with light receptacles 86 secures the flange structure to the wall. The valve assembly can be connected to a fluid flow system of the bathing installation, e.g. a water line or an air line.

The valve core member 420 includes a stem portion 420-1 which terminates in a fitting end 420-2 for engagement with the valve handle 440. The valve core member also includes core portion 420-3 having a hollow general half-cylindrical configuration, with a half-cylinder surface 420-3A and an open region 420-3B. The core member is rotatable within the body member, between a closed position in which the core surface 420-3A is in the position shown in FIG. 13A, effectively closing the port 412 to prevent substantial fluid flow between ports 412 and 414, and an open position shown in FIG. 14A. In one exemplary embodiment, the valve is used to control water flow through a water line, e.g. to a jet or other fitting. The core surface 420-3A is rotated away from the opening for port 412, allowing water flow between ports 412 and 414.

For this exemplary embodiment, the handle 440 includes a receptacle boss 440A (FIG. 13A) which receives the fitting end 420-2 of the valve core 420 in a press-fit arrangement. The handle has apertures 442 and 444 formed therein on opposite sides of the handle center portion. The handle can be injection molded as a unitary structure, of an opaque material.

The valve structure 400 further includes a bezel ring 430 which has internal threads to engage the threads on region 416 of the valve body 410, and secure the valve body to the flange structure 60'". In this exemplary embodiment, the flange structure 60'" is fabricated of a transparent or translucent material, e.g. clear ABS, clear acrylic or clear polycarbonate. The nut 80 can be fabricated of a clear or translucent material as well, or of an opaque material provided light emitted from light sources mounted in the receptacles 86 can pass through openings 86A (FIG. 13A) formed in the nut 80 at the light receptacles. Light emitted from the light sources mounted in the light receptacles thus passes through the flange structure 60''' to the bezel 430.

The bezel 430 in this exemplary embodiment is formed of a light transmissive material, e.g. transparent or translucent acrylic, polycarbonate or ABS, with opaque regions indicated by cross-hatched regions 432 and 434. The opaque regions may be formed by various techniques, e.g. by opaque overlay material such as tape, or by filling recesses with an opaque insert such as a die-cut insert, or by co-injection molding of a dissimilar opaque material with a transparent material. The rotational positions of the bezel 430 and of the valve core 420 are set relative to the orientation of the valve body 410 to establish the proper orientation of the opaque areas relative to the core position. The valve core base has a stop surface 420-3C (FIG. 13B) which interacts with a stop structure formed in the interior of the valve body which defines rotational travel limits of the valve core. The bezel rotational position may be set by the tightened position of the bezel on the threads of the valve body, typically compressing an o-ring as the bezel is tightened. Alternatively, a dead stop on the bezel interacting with a stop on the valve body may be employed. The handle or cap member 440 can be fit onto the attachment end 420-2 of the core at 90 degree intervals, to allow proper orientation relative to the body 410, core 420 and bezel 430.

Figure 13A:
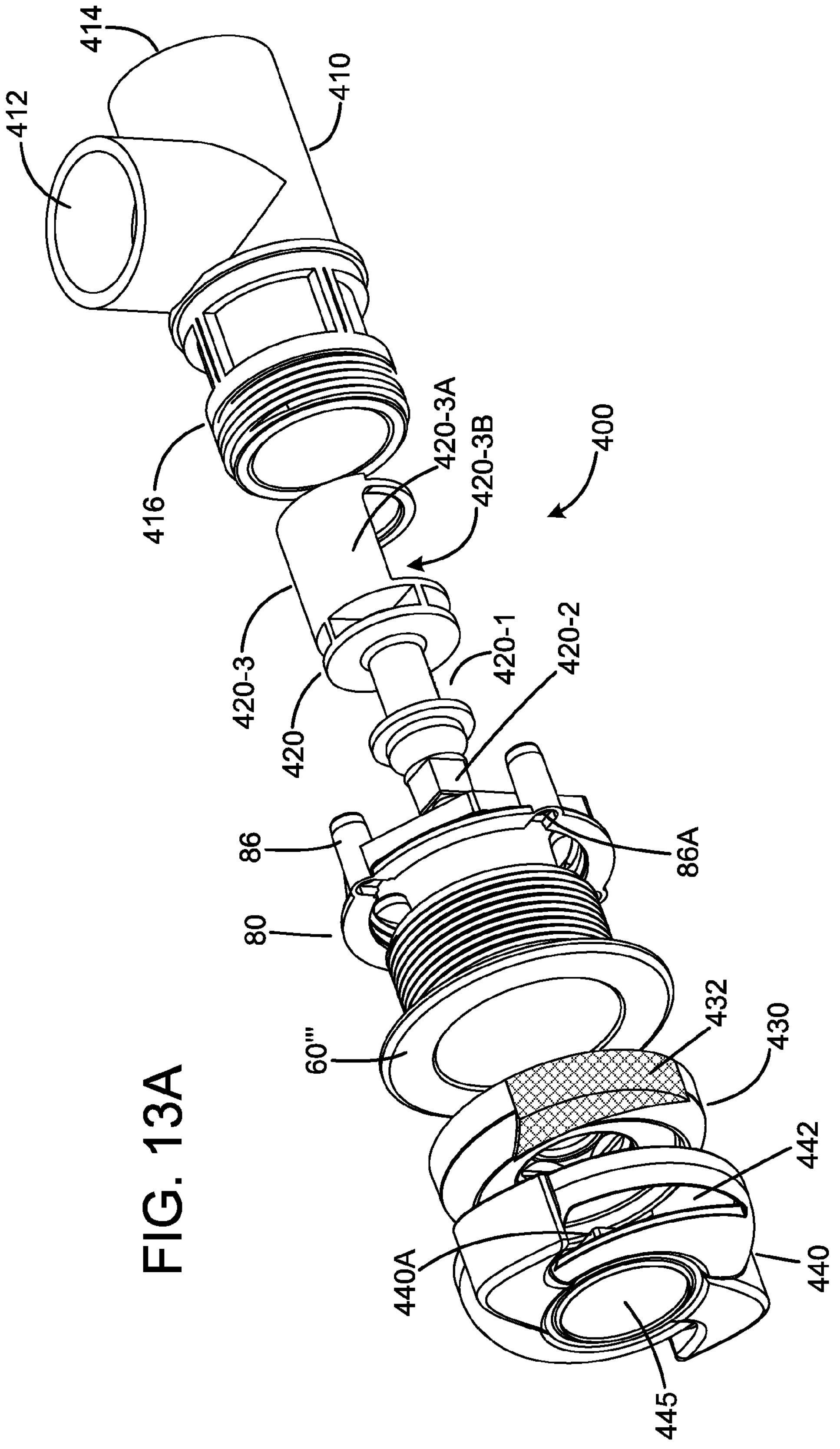
FIGS. 13A-13D illustrate an exemplary embodiment of an on/off valve for a bathing installation, with the valve in the off position.
Figure 13B:
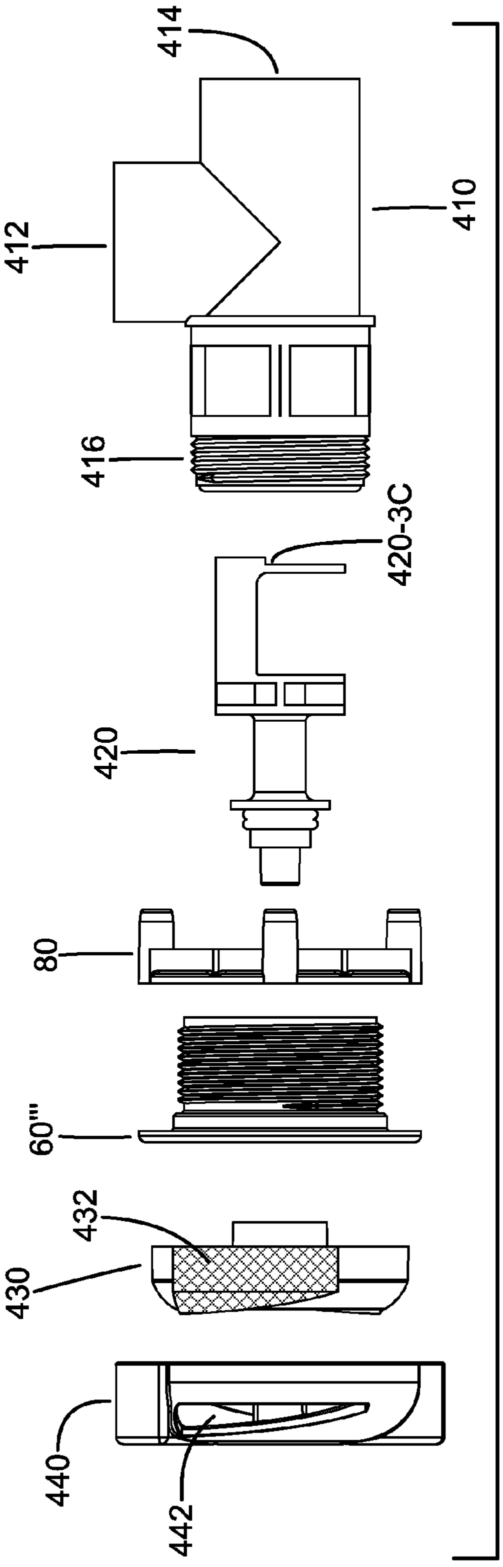
Figure 13C:
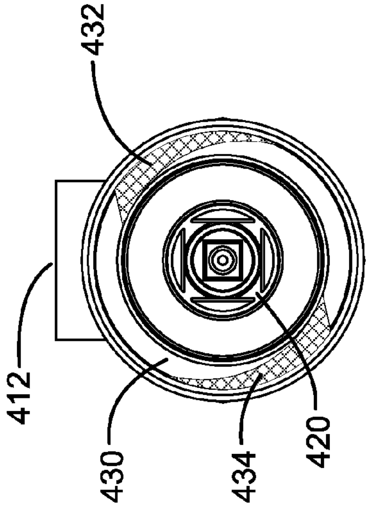
Figure 13D:
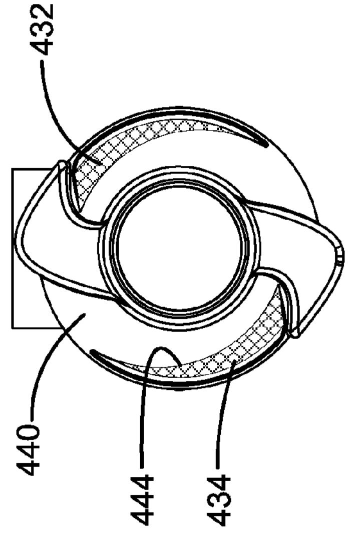
Figure 14A:
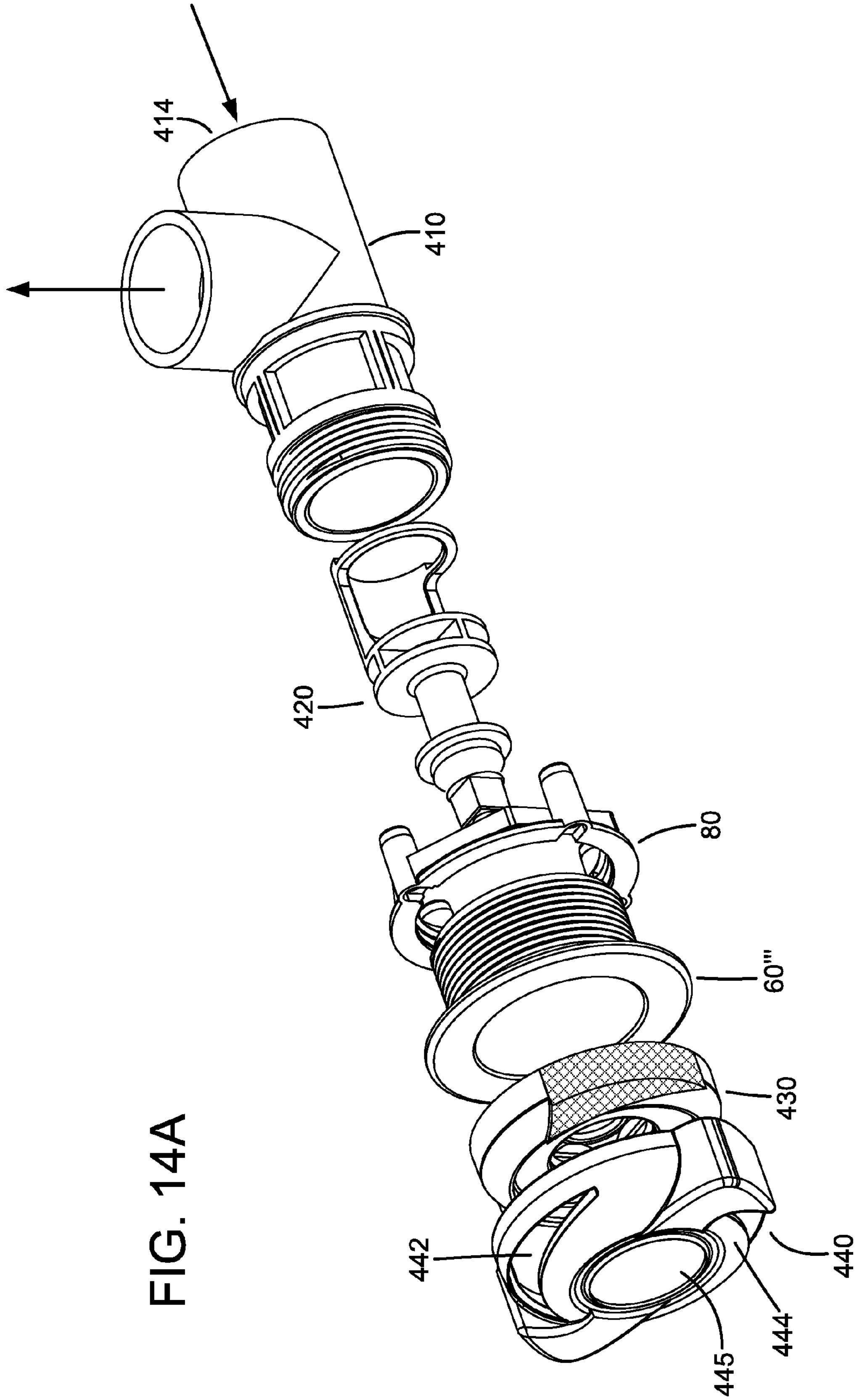
FIGS. 14A-14D illustrate the on/off valve of FIGS. 13A-13D, with the valve in the on position.
Figure 14B:
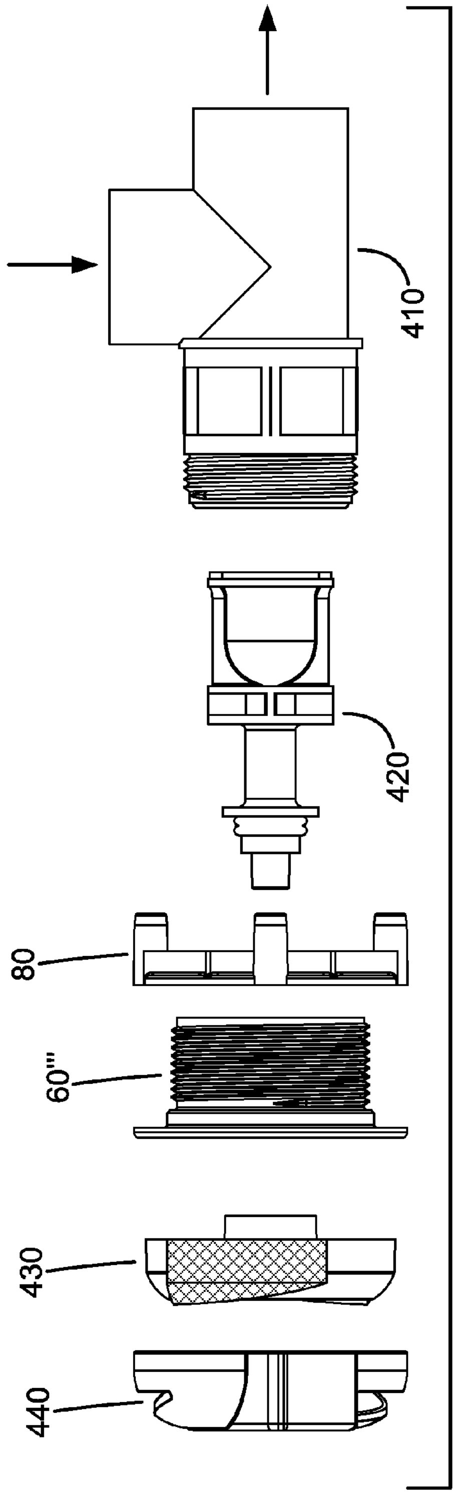
Figure 14C:
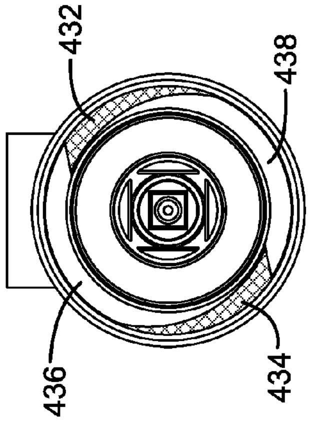
Figure 14D:
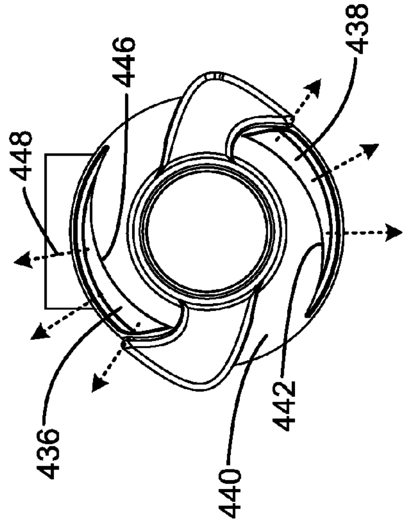
Figure 15A:
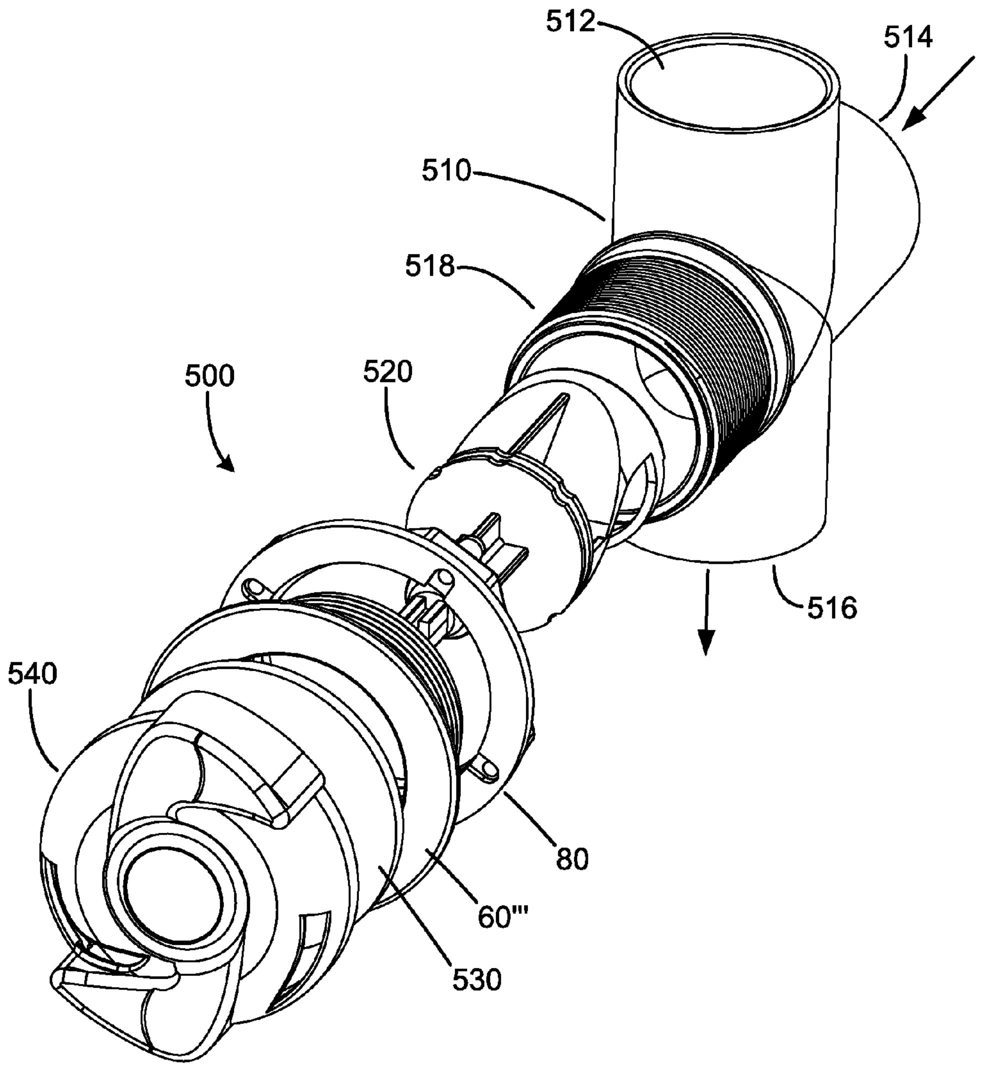
FIGS. 15A-15C illustrate an exemplary embodiment of a diverter valve for a bathing installation, with the valve in a first position.
Figure 15B:
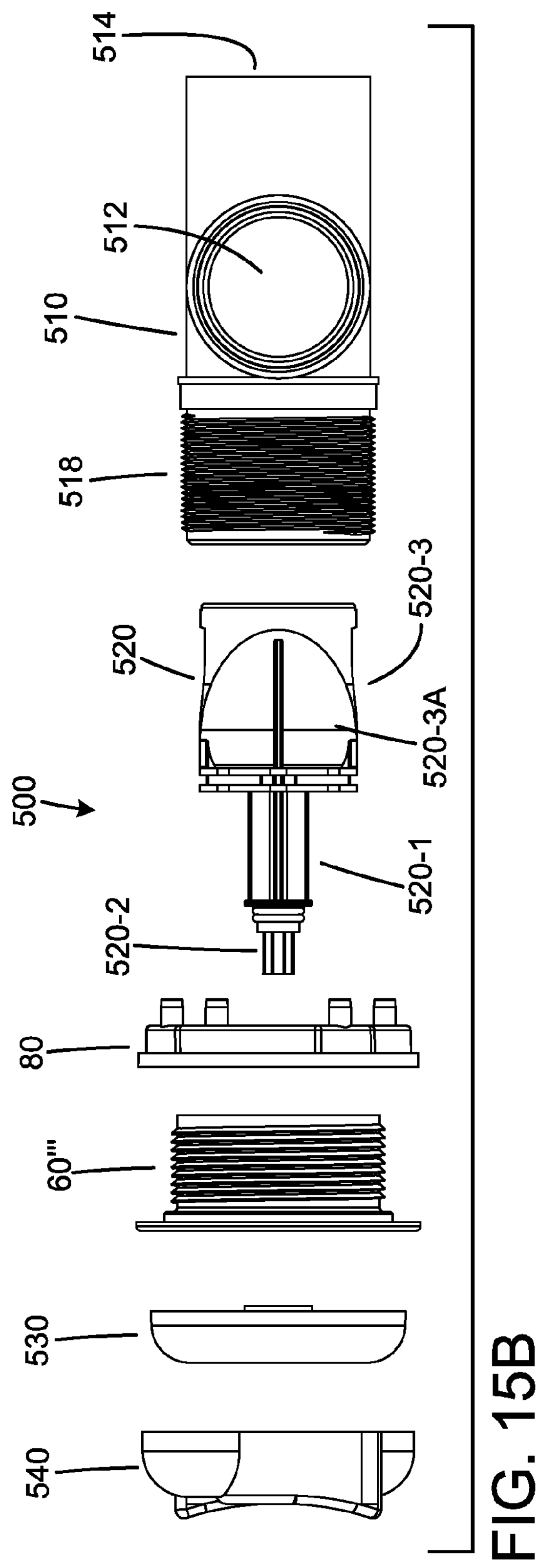
Figure 15C:
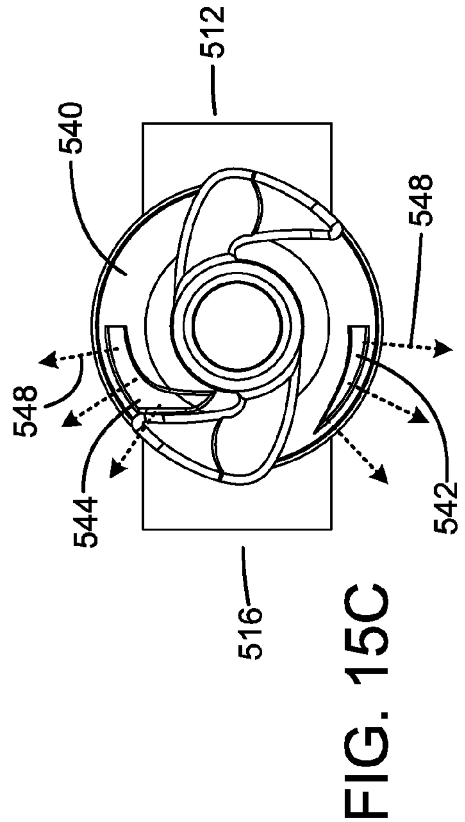

FIG. 13C is an end view of the valve assembly with the handle removed, showing the bezel 430 and the connector end 420-2 of the valve core 420. FIG. 13D is a similar view, but with the handle 440 installed in place.

The valve assembly 400 is configured to provide a visual indication of the valve status or position to the user. With light sources such as LEDs, incandescent bulbs or optical fibers installed in the light receptacles 86 of the nut 80, light emitted from the light sources is passed through the flange structure 60''' as described above. With the handle and valve core positioned to the closed position shown in FIGS. 13A, 13B and 13D, the apertures 442 and 444 of the handle are positioned over opaque areas 432, 434 of the bezel 430, and little or no light is passed through the apertures. Now consider the valve assembly in the open position, allowing water to pass between ports 412 and 414, as illustrated in FIGS. 14A-14D. In this case, the handle 440 has been rotated to position the valve core in the open position. The apertures 442 and 444 of the handle are now positioned over transparent regions of the bezel, and allow light to pass through the handle apertures, as indicated by light rays 448, thus providing a visual indication that the valve is open.

The opaque regions could alternatively be formed in the flange structure 60''', and the bezel formed as a fully transparent structure or even omitted. A male pin could protrude from valve body 410 and engage a corresponding recess in the flange structure 60''' to obtain proper alignment of the two structures.

FIGS. 15A-15C and 16A-16C illustrate an exemplary embodiment of a diverter valve 500 for a bathing installation, in which the position of the valve is indicated by a visual lighted handle member. The diverter valve 500 is similar in construction to the on/off valve 400 illustrated in FIGS. 13A-14D, except that the valve body 510 has three water ports 512, 514 and 516 instead of two as in valve 400. In this example, water enters the valve from inlet port 514, e.g. from a water line from a pump. The valve selects either port 412 or 516 as the water outlet port. Thus, the valve allows the user to select the water path through the valve to direct water either to port 512 or 516.

The valve body includes an externally threaded surface on valve portion 518, to engage internal threads formed in the bezel 530 to secure the valve body to the flange structure. The valve assembly also includes a valve core 520 with a valve stem 520-1 and a connector end 520-2 configured for press fit engagement with a boss in the center of the valve handle 540. The valve core also include diverter portion 520-3, which defines a diverter surface 520-3A positioned at a 45 degree angle relative to the longitudinal axis of the valve core. By rotating the valve core using the handle, the diverter surface is positioned to direct water from inlet port 514 to either outlet port 512 or 516.

For this exemplary embodiment, the handle 540 has apertures 542 and 544 formed therein on opposite sides of the handle center portion. The handle can be injection molded as a unitary structure, of an opaque material.

The exemplary valve assembly 500 further includes a bezel ring 530 which has internal threads to engage the external thread on body portion 518 of the valve body 510. In this exemplary embodiment, the flange structure 60''' is fabricated of a transparent or translucent material, e.g. clear ABS, clear acrylic or clear polycarbonate. The nut 80 can be fabricated of a clear or translucent material as well, or of an opaque material provided light emitted from light sources mounted in the receptacles 86 can pass through openings 86A (FIG. 15A) formed in the nut 80 at the light receptacles. Light emitted from the light sources mounted in the light receptacles thus passes through the flange structure 60''' to the bezel 530.

The bezel 530 in this exemplary embodiment is formed of a light transmissive material, e.g. transparent or translucent acrylic, polycarbonate or ABS. The bezel may be omitted from some embodiments.

Figure 16A:
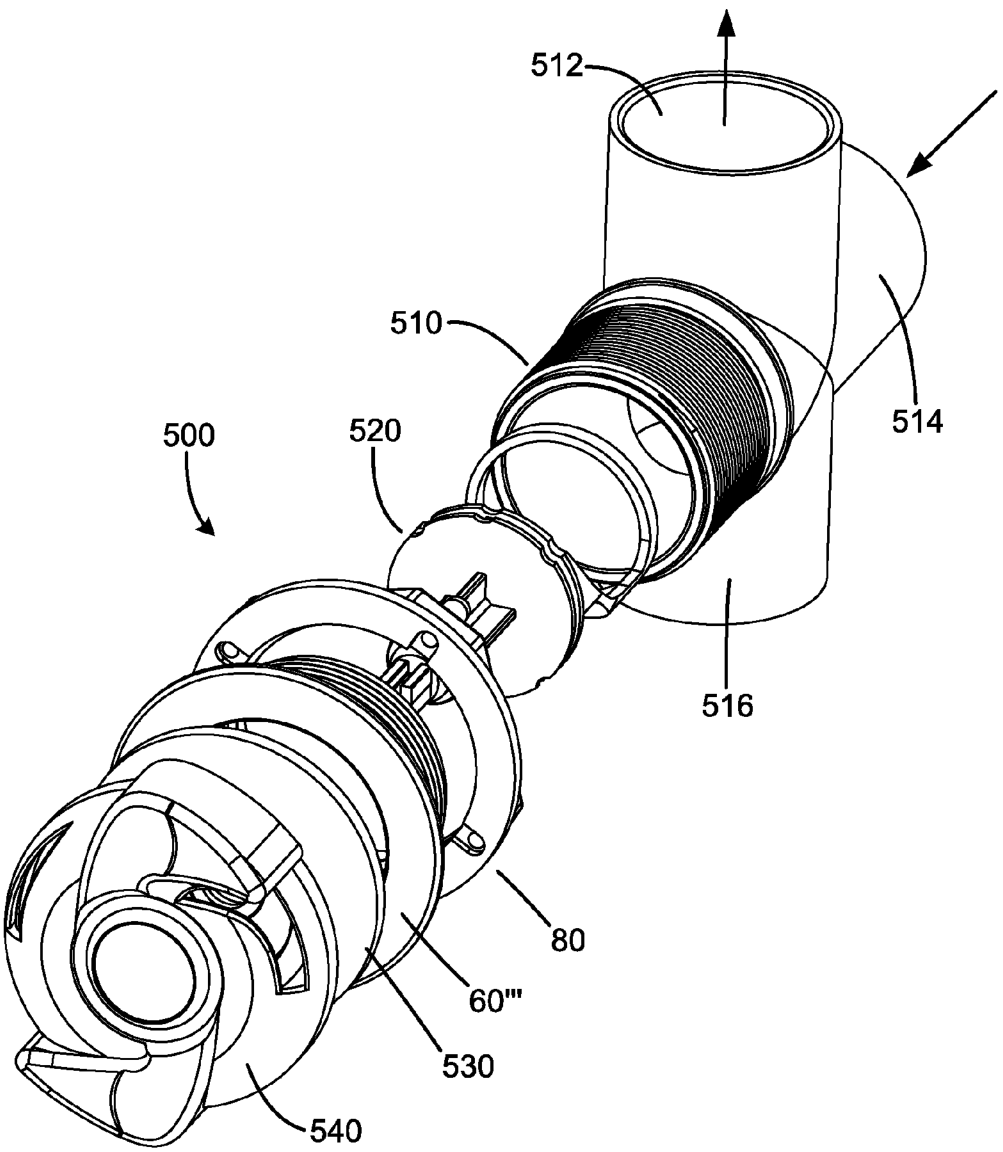
FIGS. 16A-16C are views of the diverter valve of FIGS. 15A-15C, but with the valve in a second position.
Figure 16B:
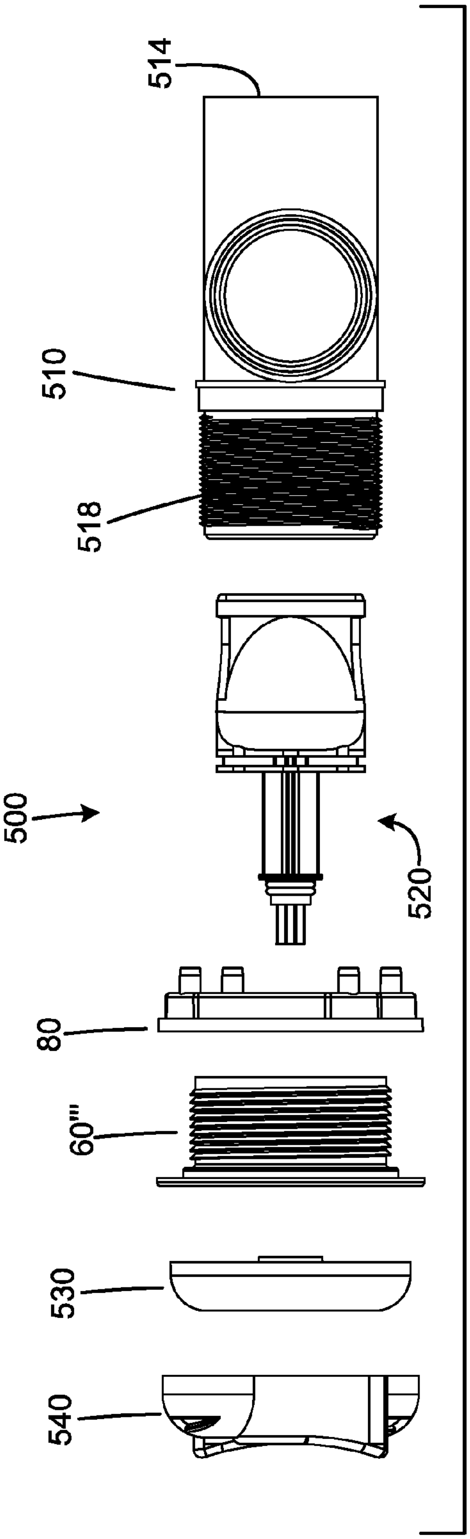
Figure 16C:
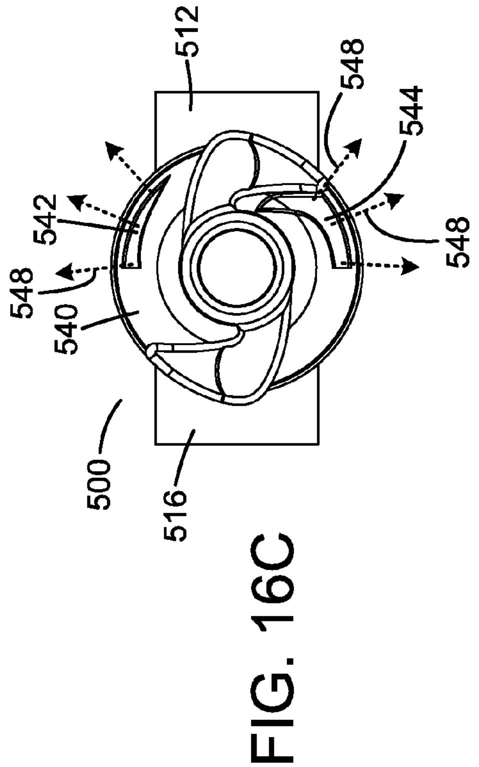

The valve assembly 500 is configured to provide a visual indication of the valve status or position to the user. With light sources such as LEDs, incandescent bulbs or optical fibers installed in the light receptacles 86 of the nut 80, light emitted from the light sources is passed through the flange structure 60''' as described above, through transparent bezel 530 and through the apertures 542 and 544 in the handle 540. The emitted light is indicated by rays 548. With the handle and valve core positioned to the first position shown in FIGS. 15A, 15B and 15C, the illuminated apertures 542 and 544 of the handle are positioned in a first angular position (see FIG. 15C) in which the apertures are on the port 516 side of the valve body. Now consider the valve assembly in the second position, allowing water to pass between ports 514 and 512, as illustrated in FIGS. 16A-16C. In this case, the handle 540 has been rotated 180 degrees to position the valve core in the second position. The illuminated apertures 542 and 544 of the handle are now positioned on the port 512 side of the valve body, and allow light to pass through the handle apertures, as indicated by light rays 548, thus providing a visual indication that the valve is in the second position.

Figure 17:
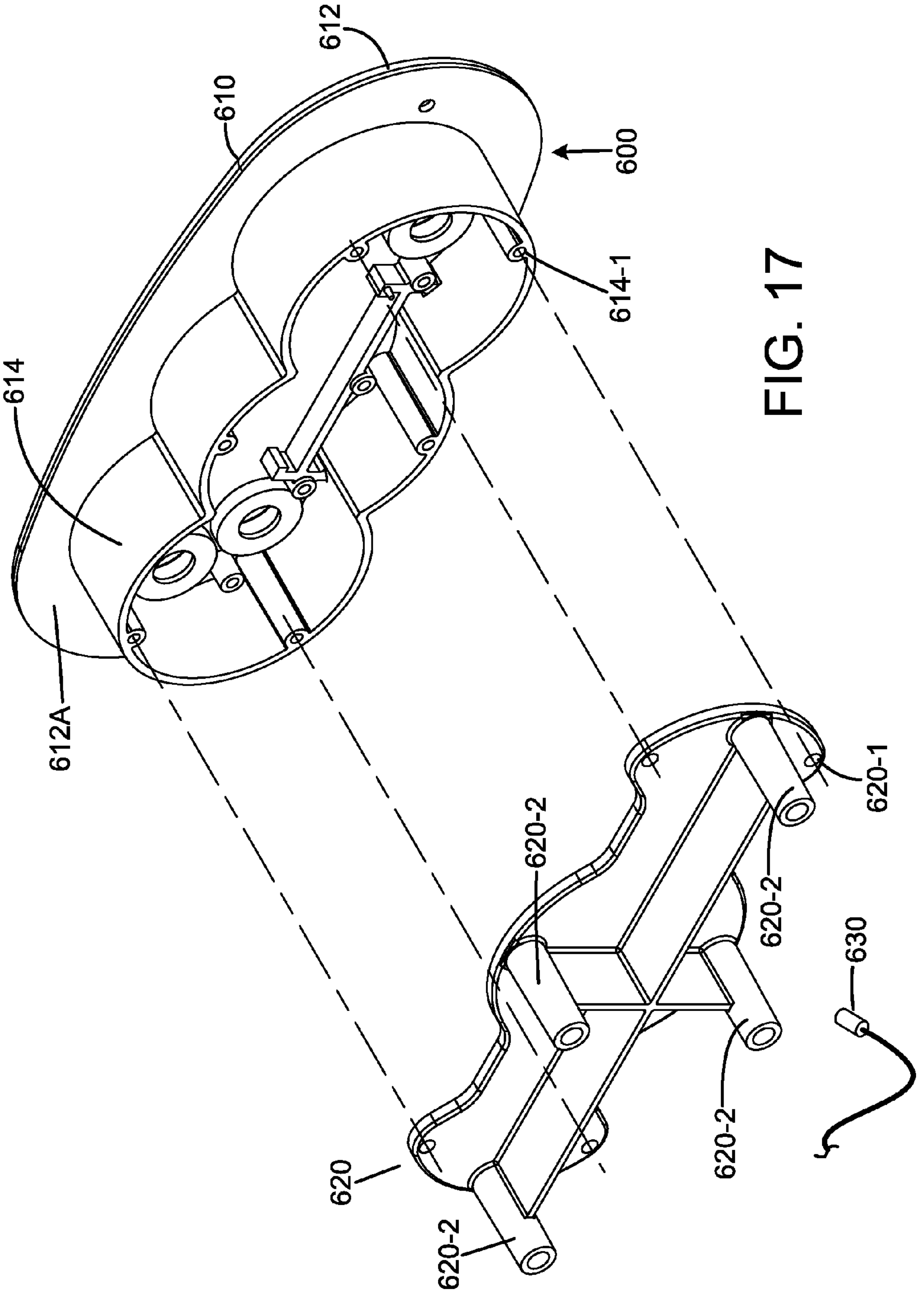
FIGS. 17-19 are respective isometric partially exploded views of different embodiments of lighted control panels for bathing installations.
Figure 18:
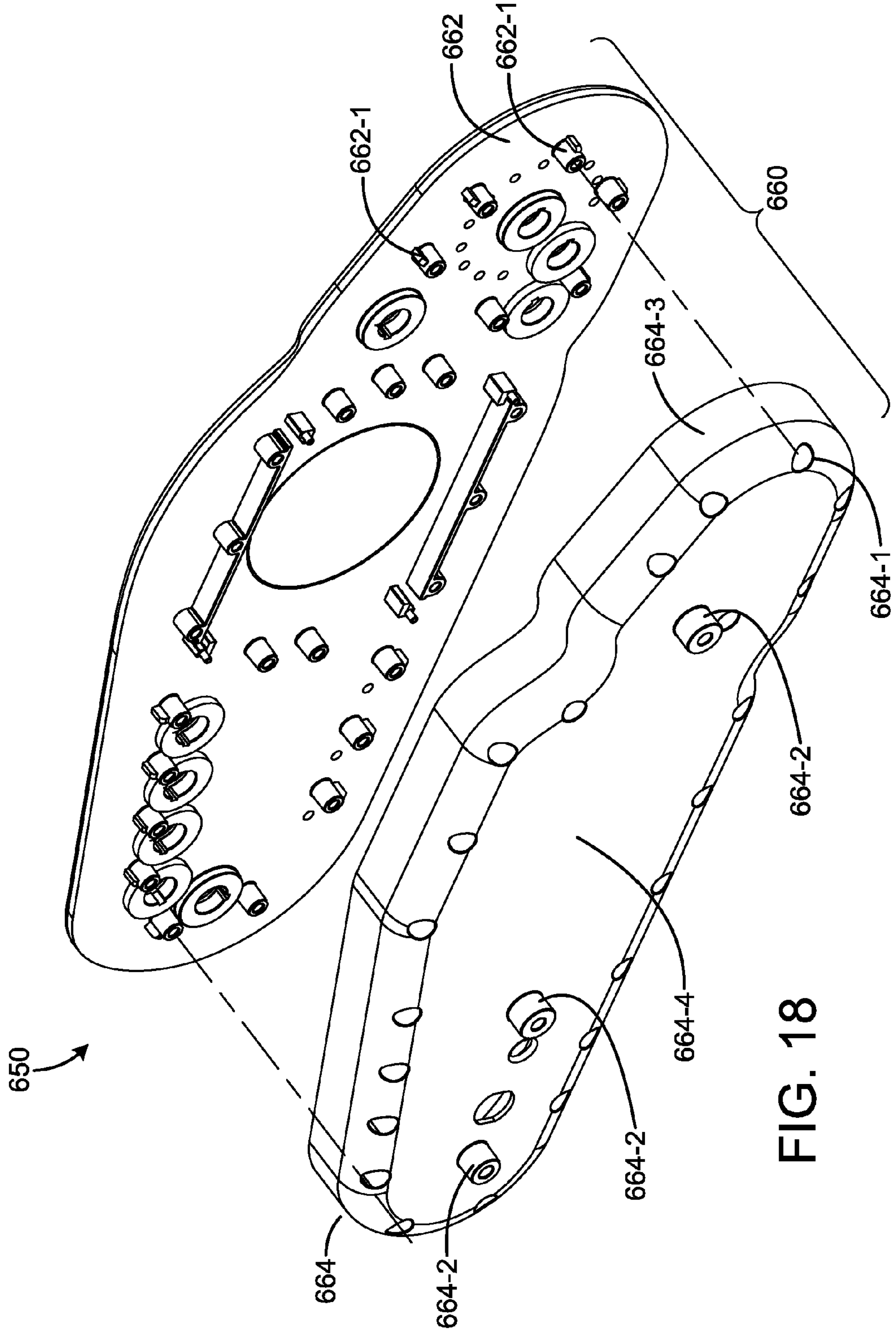
Figure 19:
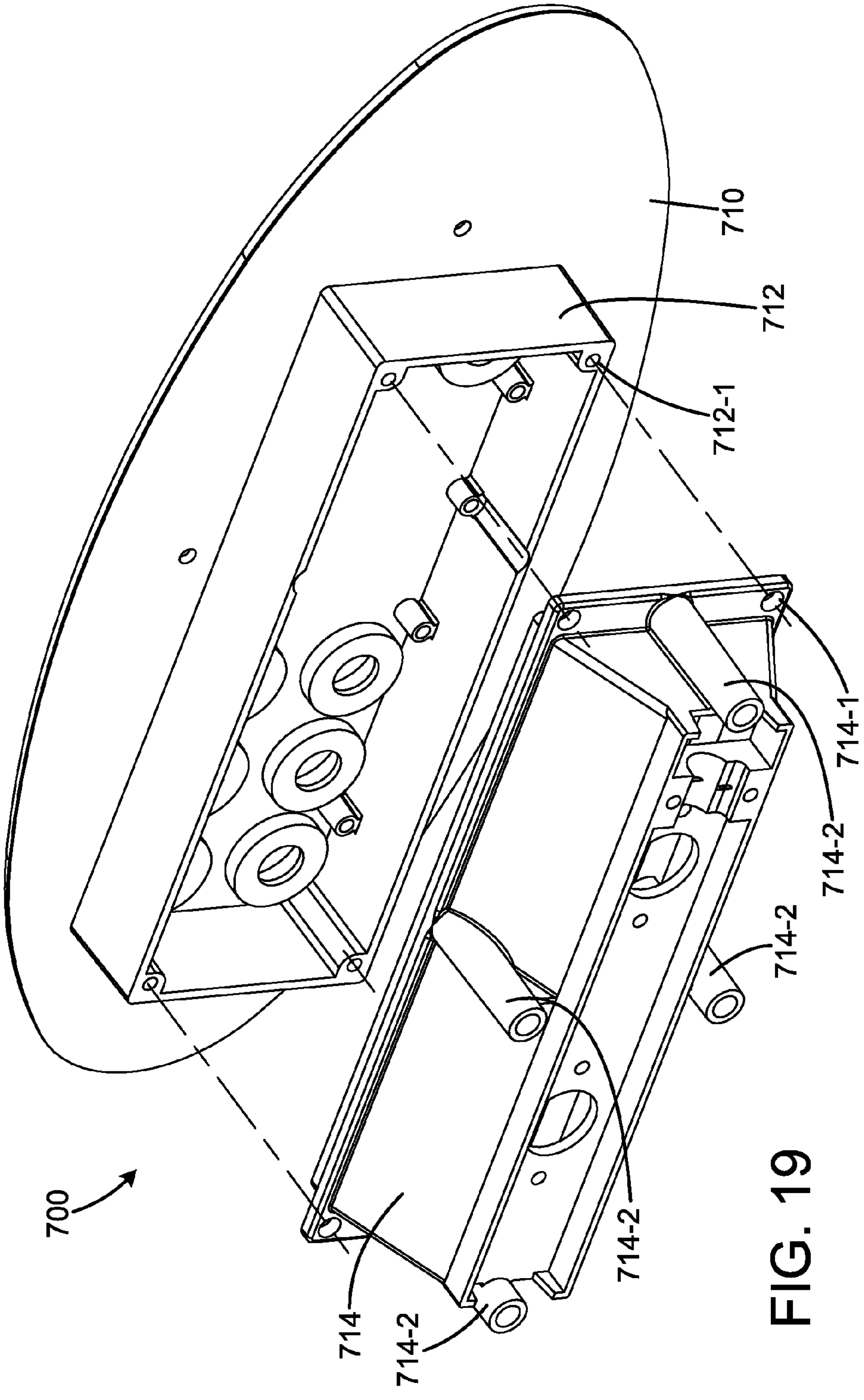

FIGS. 17-19 illustrate alternate embodiments of lighted fittings for bathing installations. Control panels are typically installed at openings formed in the bathing installation tub wall or rim. The panels may include a flange portion larger than the tub opening, and a housing portion extending through the wall and below the interior or bottom surface of the wall. An exemplary control panel and method of installation are described in co-pending application Ser. No. 11/924,498, filed Oct. 25, 2007, and published as US 20090106890, the entire contents of which are incorporated herein by this reference. Instead of fabricating the light source receptacles in the fitting wall, as with the embodiment illustrated in FIG. 11, the receptacles can be formed in a separate structure, such as a cover, fastened to the fitting wall. FIG. 17 illustrates an exemplary embodiment of a control panel 600 having a housing configuration as shown in US 20090106890, and which is configured for through hole mounting to a tub top wall surface, as shown for example in FIGS. 1 and 2 of US 20090106890. The control panel includes a housing 610 having a front panel flange portion 612 and a peripheral wall portion 614 extending transversely to the flange portion. The undersurface 612A of the flange portion may be attached to the top wall surface of the tub, e.g. by adhesive, with the wall portion 614 extending into and through the hole in the tub wall. The housing 610 may be fabricated of a translucent or transparent material such as clear or translucent acrylic, ABS or polycarbonate. Control circuitry and user interface circuitry and devices may be mounted within or on the housing and front panel.

Figure 17A:
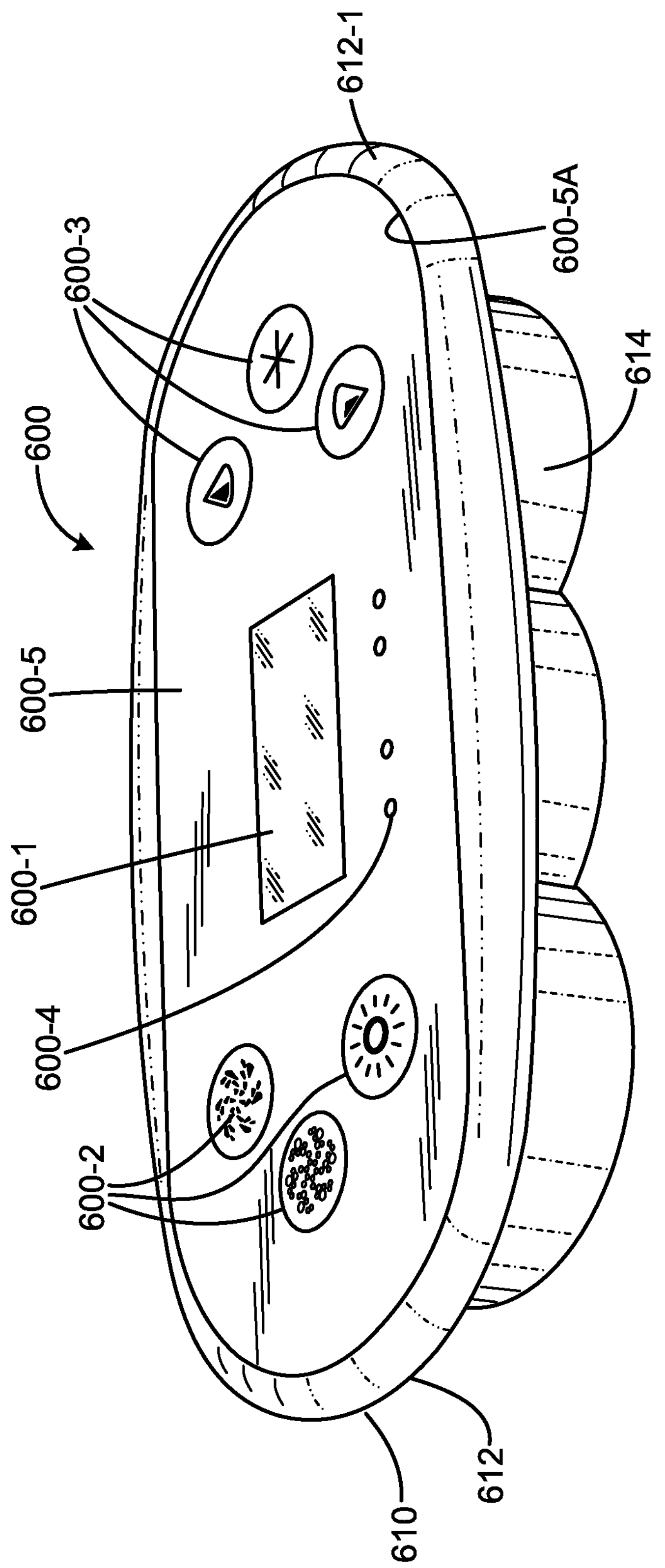
FIG. 17A shows the panel of FIG. 17 in an isometric front oblique view.

FIG. 17A shows the panel 600 in an isometric front oblique view. The panel may include a display or touchscreen panel 600-1, flanked on either side by touch-sensitive buttons 600-2 and 600-3, with LED indicators 600-4. The front surface of the panel flange surface 612 may be substantially covered by an opaque overlay membrane or layer 600-5. The opaque layer 600-5 may be fabricated of mylar or other plastic or thin metal material, typically with an adhesive backing to adhere the layer to the front flange surface. The opaque layer may have openings which match the position and size of the display window, the buttons and LED indicators, so as not to obscure these features. The opaque layer extends near the peripheral edge of the front flange, with its edge 600-5A shown in FIG. 17A. In this embodiment, the transparent flange portion 612 has an exposed edge region 612-1.

To provide a lighting effect, the control panel 600 may include a cover member 620, having a peripheral configuration which matches or overlays the periphery of the transverse wall portion 614. The cover member may be attached to the rim of the transverse wall portion, e.g. by threaded fasteners inserted through cover holes 620-1 and engaging threaded bores 614-1. The cover member in this embodiment includes a plurality of light source receptacles 620-2 spaced about the periphery of the cover member 620. The receptacles are sized to receive light sources, e.g. light source 630 which may be an LED or optical fiber or incandescent bulb, for example. The cover member in this exemplary embodiment is fabricated of a transparent material, e.g. clear or translucent acrylic, ABS or polycarbonate, so that light emitted from light source 630 will transmit through the cover member and into the wall portion 614. Alternatively, the cover member 620 may be fabricated from an opaque material, with through holes formed through the light receptacles to allow light from the light sources to pass through the holes in the cover member and into the wall portion 614. Since the wall portion 614 and the flange portion 612 of the housing 610 are fabricated of a transparent or translucent material, the light from the light sources can provide a glow or other light effect visible to the user. If the front surface of the flange portion 612 is substantially covered with an opaque layer, light from the light sources will be visible at the exposed edge region 612-1, provide an edge-lit effect. Light from the light sources will in this case be blocked by the opaque layer and by the opaque display panel and other circuit boards/circuitry mounted within the housing, so that the light sources 630 predominately illuminate the edge of the panel.

FIG. 18 illustrates another embodiment of a lighted control panel 650. The panel includes a housing structure 660 which includes a generally flat panel member 662, to which various components of the control panel can be mounted. A transparent cover 664 is configured to mount to the panel member 662, e.g. by threaded fasteners passed through openings 664-1 in the cover and engaging threaded bores formed in standoffs 662-1 protruding from the back surface of the panel member 662. The cover member includes a peripheral lip 664-3 extending transversely to a flat portion 664-4. The panel member 662 is sized to provide a flange portion outside the peripheral lip of the cover member, to engage the tub wall surface surrounding the control panel mount opening. The panel may be secured to the wall surface by adhesive, in an exemplary embodiment. Light source receptacles 664-2 are formed on the flat portion 664-4, and are configured to receive light sources such as light source 630 (FIG. 17). Alternatively, the cover member 664 may be fabricated from an opaque material, with through holes formed through the light receptacles to allow light from the light sources to pass through the holes in the cover member and to the panel member 662. Light emitted from the light sources illuminates the back surface of the panel member 662, which also is fabricated of a transparent or translucent material. Some of the light passes through the panel member 662 and is visible to the user. An opaque overlay may also be applied to the exterior surface of the panel member 662, which may result in an edge-lit effect, as described above regarding the embodiment of FIGS. 17 and 17A. The number of light receptacles may be varied, depending on the particular control panel design, to place the light at strategic locations not blocked by circuit elements mounted to the panel. In this exemplary embodiment, the light receptacles are not located on the periphery of the cover 664, but are placed at locations at which circuit elements are not placed on the panel 662 which would block light from the light sources.

FIG. 19 is an exploded isometric view illustrating another embodiment 700 of a lighted control panel for a bathing installation, configured for mounting to an opening in the tub flat surface. In this embodiment, the control panel includes a flat panel 710 and a transverse wall 712, forming a housing generally analogous to the control panel housing of the embodiment of FIG. 17. The flat panel 710 and the transverse wall may be fabricated either as separate structures or as one integrally formed unit, fabricated of a transparent or translucent material. The flat panel defines a flange portion large enough to overlap onto the tub wall surface surrounding the panel opening, and the control panel may be attached to the tub wall surface by adhesive. The control panel includes a cover structure 714 configured to attach to the exposed rim of the wall 712, e.g. by threaded fasteners passed through openings 714-1 in the cover and engaging threaded bores 712-1 formed in the transverse wall. Light receptacles 714-2 are formed in spaced relation about the periphery of the cover, and are configured to mount light sources as described above regarding the embodiment of FIG. 17. The cover member 714 may be an integrally formed structure fabricated of a transparent or translucent material. Some of the light emitted by the light sources in the receptacles 714-2 passed through the wall 712 and into the flat panel 710, providing a lighting effect. An opaque overlay may also be applied to the exterior surface of the panel member 710 which may result in an edge-lit effect, as described above regarding the embodiment of FIGS. 17 and 17A. The cover member 714 may alternatively be fabricated from an opaque material, with through holes formed through the light receptacles to allow light from the light sources to pass through the holes in the cover member and to the panel 710.

Although the foregoing has been a description and illustration of specific embodiments of the subject matter, various modifications and changes thereto can be made by persons skilled in the art without departing from the scope and spirit of the invention as defined by the following claims.

What is claimed is:

1. A fitting assembly for through hole mounting to a panel of a bathing installation, comprising:

a flange structure fabricated of a translucent material, the flange structure including a flange body portion adapted to extend through a mount hole in the panel and having an outer peripheral portion, and a transverse flange portion having an outer size larger than the mount hole, so that a periphery flange portion overlaps the panel surrounding the hole when the flange structure is installed in the mount hole;

a connector member configured to engage the outer peripheral portion of the flange structure, the connector member having at least one light source attachment portion, so that with the flange structure mounted to the panel with the connector member in engagement with the flange structure, the light source attachment portion is disposed on a first side of the panel such that light emitted from at least one light source mounted in the at least one light source attachment portion is transmitted through the connector member into the flange structure and through the mount hole to illuminate the transverse flange portion on a second side of the panel;

a valve assembly including a manually operable handle, the valve assembly including a valve body structure disposed on the first side of the panel and including a body portion disposed within the flange structure, and a valve core structure including a portion disposed in the valve body and a portion extending into the flange structure for connection to the handle disposed on the second side of the panel.

2. The fitting assembly of claim 1, wherein the handle is rotatable to position the valve core structure at a plurality of operating positions.

3. The fitting assembly of claim 2, in which:

a visual valve status indication is provided by light emitted through the flange structure and selectively through the handle in dependence on handle position.

4. The fitting assembly of claim 2, further comprising:

a bezel structure configured for threaded attachment to the body portion of the valve body, with the bezel structure positioned on the second side of the panel and arranged between the flange structure and the handle in stationary position during handle operation.

5. The fitting assembly of claim 4, wherein the bezel structure includes a transparent region and at least one opaque region, and the handle includes an opaque portion and at least one open or transparent window region, and wherein the window permits light emitted from the at least one light source to pass with the handle in a first position, and the handle opaque portion and the bezel opaque region block light from passing when the handle is in a second position and the window is not aligned with the transparent region of the bezel.

6. The fitting assembly of claim 5, wherein the valve assembly provides an on/off function for fluid flow between a first valve port and a second valve port, and the first position of the handle corresponds to a valve-open state, and the second position corresponds to a valve-closed state.

7. The fitting assembly of claim 4, wherein the bezel structure is transparent, and the handle includes an opaque portion and at least one open or transparent window region, and wherein the radial position of the handle is indicated by light passing through the at least one open or transparent window region.

8. The fitting assembly of claim 7, in which the valve assembly is a diverter valve which provides a diverter function of allowing fluid flow between a first valve port and a second valve port with the handle in a first position, and allow fluid flow between the first valve port and a third valve port with the handle in a second position.

9. The fitting assembly of claim 1, wherein the flange structure is a generally hollow structure open at a flange portion end and open at a distal end.

10. The fitting assembly of claim 1, wherein the connector member is a threaded nut member configured to engage a threaded outer peripheral portion of the flange structure on the first side of the panel.

11. The fitting assembly of claim 1, wherein the at least one light source attachment portion is integrally formed with the connector member to form a unitary structure.

12. A fitting for through hole mounting to a panel of a bathing installation, comprising:

a housing structure fabricated of a transparent or translucent material, the housing structure including a hollow body portion adapted to extend through a mount hole in the panel and having an outer peripheral portion, and a transverse front panel flange portion having an outer size larger than the mount hole, so that a peripheral flange portion of the front panel flange portion overlaps the panel surrounding the mount hole when the housing structure is installed in the mount hole;

the transverse front panel flange portion including a front surface portion extending over the mount hole;

the transverse front panel flange portion and the hollow body portion defining a single unitary structure of the housing structure;

a back cover structure separate from the housing structure and configured for attachment to the hollow body portion on an opposite side of the panel from the transverse front panel flange structure to cover a housing area surrounded by the outer peripheral portion of the hollow body portion, the back cover structure including a plurality of light source receptacles disposed in spaced relation on a back surface of the back cover structure, each light source receptacle configured to hold a light source inserted into the receptacle from outside the back cover structure and outside the housing area so that with the housing structure mounted to the panel, light emitted from a light source mounted in each light source receptacle is transmitted through the back cover structure and at least one of the body portion and the housing area and into the transverse front panel flange portion to illuminate at least a portion of the transverse front panel flange portion; and wherein the fitting is a control panel for the bathing installation and electronic circuitry is mounted within the housing area.

13. The fitting of claim 12, further comprising an opaque layer substantially covering regions of a top surface of the transverse front panel flange portion, and wherein the illumination provided by the light source provides an edge-lit lighting effect.

14. The fitting of claim 13, wherein the control panel includes a display panel, touch buttons and indicator lights.

15. The fitting of claim 12, wherein the plurality of light source receptacles are disposed at locations on the rear cover portion which are spaced from a cover periphery, said back cover structure and said plurality of light source receptacles forming an integrally formed structure with said plurality of light source receptacles protruding from a rear surface of the back cover structure.

16. The fitting of claim 15, wherein said integrally formed structure is fabricated of a transparent or translucent material.

17. The fitting of claim 15, wherein said integrally formed structure is fabricated of an opaque material, with through holes formed through the plurality of light receptacles to allow light from the light sources to pass through the holes and to the transverse front panel flange portion.

18. A fitting assembly for through hole mounting to a panel of a bathing installation, comprising:

a flange structure fabricated of a translucent material, the flange structure including a flange body portion adapted to extend through a mount hole in the panel and having an outer peripheral portion, and a transverse flange portion having an outer size larger than the mount hole, so that a periphery flange portion overlaps the panel surrounding the hole when the flange structure is installed in the mount hole;

a connector member configured to engage the outer peripheral portion of the flange structure, the connector member having at least one light source attachment portion, so that with the flange structure mounted to the panel with the connector member in engagement with the flange structure, the light source attachment portion is disposed on a first side of the panel such that light emitted from at least one light source mounted in the at least one light source attachment portion is transmitted through the connector member into the flange structure and through the mount hole to illuminate the transverse flange portion on a second side of the panel;

a control assembly including a handle, the control assembly including a body structure disposed on the first side of the panel and including a body portion disposed within the flange structure, and a control structure including a portion disposed in the body structure and a portion extending into the flange structure for connection to the handle disposed on the second side of the panel.

19. The fitting assembly of claim 18, wherein the handle is rotatable to position the control structure at a plurality of operating positions.

20. The fitting assembly of claim 19, in which:

a visual control status indication is provided by light emitted through the flange structure and selectively through the handle in dependence on handle position.

21. The fitting assembly of claim 19, further comprising:

a bezel structure configured for threaded attachment to the body portion of the control body structure, with the bezel structure positioned on the second side of the panel and arranged between the flange structure and the handle in stationary position during handle operation.

22. The fitting assembly of claim 21, wherein the bezel structure includes a transparent region and at least one opaque region, and the handle includes an opaque portion and at least one open or transparent window region, and wherein the window permits light emitted from the at least one light source to pass with the handle in a first position, and the handle opaque portion and the bezel opaque region block light from passing when the handle is in a second position and the window is not aligned with the transparent region of the bezel.

23. The fitting assembly of claim 21, wherein the bezel structure is transparent, and the handle includes an opaque portion and at least one open or transparent window region, and wherein the radial position of the handle is indicated by light passing through the at least one open or transparent window region.

24. The fitting assembly of claim 18, wherein the flange structure is a generally hollow structure open at a flange portion end and open at a distal end.

25. The fitting assembly of claim 18, wherein the connector member is a threaded nut member configured to engage a threaded outer peripheral portion of the flange structure on the first side of the panel.

26. The fitting assembly of claim 18, wherein the at least one light source attachment portion is integrally formed with the connector member to form a unitary structure.

27. The fitting assembly of claim 18, wherein the control assembly is a valve assembly, the body structure is a valve body structure, and the control structure is a valve core structure.

* * * * *